United States Patent
Bhaisaheb et al.

(10) Patent No.: US 12,475,114 B2
(45) Date of Patent: Nov. 18, 2025

(54) SYSTEM AND METHOD FOR PROGRAM SYNTHESIS FOR WEAKLY-SUPERVISED MULTIMODAL QUESTION ANSWERING USING FILTERED ITERATIVE BACK-TRANSLATION

(71) Applicant: Tata Consultancy Services Limited, Mumbai (IN)

(72) Inventors: Shabbirhussain Hamid Bhaisaheb, Pune (IN); Shubham Singh Paliwal, New Delhi (IN); Manasi Samarth Patwardhan, Pune (IN); Rajaswa Ravindra Patil, Pune (IN); Lovkesh Vig, Noida (IN); Gautam Shroff, Noida (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 224 days.

(21) Appl. No.: 18/453,393

(22) Filed: Aug. 22, 2023

(65) Prior Publication Data

US 2024/0119046 A1    Apr. 11, 2024

(30) Foreign Application Priority Data

Sep. 29, 2022   (IN) .............. 202221056011

(51) Int. Cl.
*G06F 40/30* (2020.01)
*G06F 16/2452* (2019.01)
(Continued)

(52) U.S. Cl.
CPC ...... *G06F 16/24522* (2019.01); *G06F 40/211* (2020.01); *G06F 40/30* (2020.01); *G06V 30/18181* (2022.01)

(58) Field of Classification Search
CPC .... G06F 40/211; G06F 40/253; G06F 40/268; G06F 40/284; G06F 40/30; G06N 3/08
See application file for complete search history.

(56) References Cited

U.S. PATENT DOCUMENTS 8,229,734 B2 *   7/2012  Bennett ............... G09B 7/00
                                                          707/750
9,984,116 B2 *   5/2018  Rais Ghasem ....... G06F 16/243
(Continued)

FOREIGN PATENT DOCUMENTS

CA   3135717 A1 *   4/2022  ........... G06F 16/243
EP   1538535 A2 *   6/2005  ........... G06F 40/211
(Continued)

OTHER PUBLICATIONS

Bandyopadhyay et al., "Natural Language Response Generation from SQL with Generalization and Back- translation," Proceedings of the First Workshop on Interactive and Executable Semantic Parsing, pp. 46-49 (2020).
(Continued)

*Primary Examiner* — Lamont M Spooner
(74) *Attorney, Agent, or Firm* — Finnegan, Henderson, Farabow, Garrett & Dunner, LLP

(57) ABSTRACT

This disclosure relates generally to program synthesis for weakly-supervised multimodal question answering using filtered iterative back-translation (FIBT). Existing approaches for chart question answering mainly address structural, visual, relational, or simple data retrieval queries with fixed-vocabulary answers. The present disclosure implements a two-stage approach where, in first stage, a computer vision pipeline is employed to extract data from chart images and store in a generic schema. In second stage, SQL programs for Natural Language (NL) queries are generated in dataset by using FIBT. To adapt forward and backward models to required NL queries, a Probabilistic
(Continued)

Context-Free Grammar is defined, whose probabilities are set to be inversely proportional to SQL programs in training data and sample programs from it. Compositional similarity-based filtration strategy employed on the NL queries generated for these SQL programs enables synthesizing, filtering, and appending NL query-SQL program pairs to training data, iteratively moving towards required NL query distribution.

9 Claims, 6 Drawing Sheets

(51) Int. Cl.
*G06F 40/211* (2020.01)
*G06V 30/18* (2022.01)

(56) References Cited

U.S. PATENT DOCUMENTS

| | | | |
|---|---|---|---|
| 10,691,685 | B2 | 6/2020 | Verma et al. |
| 11,599,749 | B1* | 3/2023 | Ziaeefard ............... G06N 3/08 |
| 11,921,711 | B2* | 3/2024 | He ........................ G06F 16/243 |
| 11,934,461 | B2* | 3/2024 | Setlur ..................... G06F 40/30 |
| 11,971,887 | B2* | 4/2024 | Popescu ................ G06F 40/205 |
| 2010/0215270 | A1* | 8/2010 | Manohar ................ G06F 21/36 |
| | | | 382/218 |
| 2010/0274552 | A1* | 10/2010 | Gao ........................ G06F 40/51 |
| | | | 704/2 |
| 2011/0320187 | A1* | 12/2011 | Motik ................ G06F 16/3344 |
| | | | 704/9 |
| 2013/0226846 | A1* | 8/2013 | Li .......................... G06N 20/00 |
| | | | 706/12 |
| 2017/0046409 | A1* | 2/2017 | Bender ............... G06F 16/2455 |
| 2018/0349377 | A1* | 12/2018 | Verma .................... G06N 3/045 |
| 2018/0373753 | A1* | 12/2018 | Flaks ..................... G06F 16/245 |
| 2019/0065453 | A1* | 2/2019 | Bulgakov ............. G06F 40/211 |
| 2019/0392066 | A1* | 12/2019 | Kim .................. G06F 16/24578 |
| 2020/0257679 | A1* | 8/2020 | Sheinin ..................... G06N 3/08 |
| 2020/0334233 | A1* | 10/2020 | Lee ........................ G06F 16/243 |
| 2020/0334252 | A1* | 10/2020 | Lee ........................ G06N 3/045 |
| 2021/0064642 | A1* | 3/2021 | Qian .................. G06F 16/3344 |
| 2021/0191936 | A1* | 6/2021 | Khorasani .............. G06N 20/00 |
| 2021/0357409 | A1* | 11/2021 | Rodriguez ........ G06F 16/24553 |
| 2022/0222956 | A1* | 7/2022 | Sharma .................. G06V 10/82 |
| 2022/0230061 | A1* | 7/2022 | Singh ..................... G06F 40/20 |
| 2022/0318247 | A1* | 10/2022 | Sen ........................ G06F 16/243 |
| 2023/0196027 | A1* | 6/2023 | Tunstall-Pedoe ..... G06F 16/243 |
| | | | 704/9 |

FOREIGN PATENT DOCUMENTS

| | | | | |
|---|---|---|---|---|
| EP | 4187400 A1 * | 5/2023 | ............ | G06F 40/117 |
| WO | WO-2016174682 A1 * | 11/2016 | ............. | G06Q 10/10 |
| WO | WO-2018136804 A1 * | 7/2018 | ............. | H04L 9/008 |

OTHER PUBLICATIONS

Hagopian et al., "Learning Logical Representations from Natural Languages with Weak Supervision and Back-Translation," 33rd Conference on Neural Information Processing Systems (2019).
Hoang et al., "Iterative Back-Translation for Neural Machine Translation," Proceedings of the 2nd Workshop on Neural Machine Translation and Generation, pp. 18-24 (2018).
Khatri et al., "Filtering Back-Translated Data in Unsupervised Neural Machine Translation," Proceedings of the 28th International Conference on Computational Linguistics, pp. 4334-4339 (2020).
Kumari et al., "Domain Adaptation for NMT via Filtered Iterative Back-Translation," Proceedings of the Second Workshop on Domain Adaptation for NLP, pp. 263-271 (2021).
Nguyen et al., "Iterative Multilingual Neural Machine Translation for Less-Common and Zero-Resource Language Pairs," (2020).

* cited by examiner

SYSTEM AND METHOD FOR PROGRAM SYNTHESIS FOR WEAKLY-SUPERVISED MULTIMODAL QUESTION ANSWERING USING FILTERED ITERATIVE BACK-TRANSLATION

PRIORITY CLAIM

This U.S. patent application claims priority under 35 U.S.C. § 119 to: Indian Patent Application No. 202221056011, filed on Sep. 29, 2022. The entire contents of the aforementioned application are incorporated herein by reference.

TECHNICAL FIELD

The disclosure herein generally relates to multimodal question answering, and, more particularly, to a system and method for program synthesis for weakly-supervised multimodal question answering using filtered iterative back-translation.

BACKGROUND

Charts and plots are compact visualization techniques capturing illustrated facts that are frequently used in scientific and financial documents for summarizing observations and drawing conclusions. Inferring relevant conclusions from charts entails answering complex reasoning style queries, a task which has so far proved challenging to automate. The fine-grained perception capabilities required to understand the contents of a chart image are an additional obstacle towards automated analysis of such complex queries.

Most existing approaches and datasets for automatic question answering over charts specifically focus on structural, visual, relational, or simple data retrieval type queries. Structural queries (depicted in Table 1) pertain to attributes (which includes color, size) of the visual elements of the graph and are not realistic queries for real-life applications. Data retrieval queries (depicted in Table 1) retrieve a specific value in the graph and are trivial to address once the composition of the chart is understood. Also, as depicted in Table 1, many existing approaches assume either binary answers or assume the answer belongs to a fixed vocabulary. On the other hand, for real world applications, more complex reasoning-based queries have to be answered which involves a combination of perception, language understanding, and reasoning.

High precision extraction of fine-grained visual elements in charts (which includes chart title, X/Y-ticks, X/Y-labels, legend preview, legend labels, and the bar/line/dot detection) is critical for the chart Question Answering (QA) task, as errors in this step would get propagated to the downstream inference task leading to substantial discrepancies in the final answer. Some of the existing techniques expect the chart images to be in a specific format such as JavaScript or bitmaps to extract chart elements. Existing end-to-end approaches for chart question answering use Convolutional Neural Networks and Long Short-Term Memory (CNNs) and LSTMs to extract image and question features at various level of granularity or fuse the chart entities extracted using a Masked Recurrent Convolutional Neural Network (RCNN) and the Natural Language (NL) question using spatial attention to predict the answer. However, these approaches provide results on few datasets which contains relatively simpler queries.

Current approaches for table question answering use an end-to-end modeling approach for either: (i) directly generating the answer, (ii) generate a program which produces the answer upon execution of the generated Structured Query Language (SQL) or (iii) using a Language Model pre-training strategy. However, these approaches are mainly designed for handling data retrieval or simple aggregation type of queries. The complex reasoning type queries which are part of the PlotQA dataset involve nested arithmetic operations with self-joins as well as nesting in the conditional (WHERE) clauses.

TABLE 1

| | PlotQA Example Queries for various charts, (Answer Types): Yes/No, Fixed, Chart or Open Vocabulary | | | |
|---|---|---|---|---|
| Query | (a) Dot Chart | (b) Horizontal Bar | (c) Vertical Bar | (d) Line Chart |
| Structural | Is the number of dotlines equal to the number of legend labels? (Y/N) | How many groups of bars are there? (Fixed) | Does the graph contain any zero values? (Y/N) | Does the graph contain grids? (Y/N) |
| Retrieval | What is the amount collected as tax on revenue in 2005? (Open) | What is the label of the 4th group of bars from the top? (Chart) | What is the label or title of the Y-axis? (Chart) | What is the title of the graph? (Chart) |
| Reasoning | Is the difference between the amount collected as tax on goods in 2003 and 2007 greater than the difference between the amount | What is the difference between the highest and the second highest percentage of amount spent on other expenses? (Open) | Do the majority of the years between 2008 and 2011 (inclusive) have the cost of communications and computer greater than 10? (Y/N) | Does the percentage of firms offering quality certification monotonically increase over the years? (Y/N) |

TABLE 1-continued

PlotQA Example Queries for various charts, (Answer Types): Yes/No, Fixed, Chart or Open Vocabulary

| Query | (a) Dot Chart | (b) Horizontal Bar | (c) Vertical Bar | (d) Line Chart |
|---|---|---|---|---|
| | collected as tax on exports in 2003 and 2007? (Y/N) | | | |

SUMMARY

Embodiments of the present disclosure present technological improvements as solutions to one or more of the above-mentioned technical problems recognized by the inventors in conventional systems. For example, in one embodiment, a method for program synthesis for weakly-supervised multimodal question answering using filtered iterative back-translation is provided. The method includes receiving, via one or more hardware processors, one or more images specific to one or more charts from a dataset and extracting data from the one or more images specific to the one or more charts by employing a computer vision pipeline, wherein the extracted data is stored in a schema of a database and wherein the one or more charts comprises a plurality of questions and a corresponding plurality of answers; iteratively performing, via the one or more hardware processors: obtaining, via the one or more hardware processors, a first plurality of SQL programs corresponding to a first plurality of Natural Language (NL) queries using a trained first semantic parser model; executing, via the one or more hardware processors, the first plurality of SQL programs on the corresponding extracted data of the database to obtain a plurality of answers; comparing, via the one or more hardware processors, the plurality of answers for the first plurality of Natural Language (NL) queries corresponding to the obtained first plurality of SQL programs with a corresponding plurality of answers for the first plurality of Natural Language (NL) queries comprised in the dataset; filtering, via the one or more hardware processors, the first plurality of SQL programs corresponding to the first plurality of Natural Language (NL) queries based on the comparison, wherein the plurality of answers for the first plurality of Natural Language (NL) queries corresponding to the first plurality of SQL programs are matching with the corresponding plurality of answers for the first plurality of Natural Language (NL) queries comprised in the dataset; training, via the one or more hardware processors, a second semantic parser model using the filtered first plurality of SQL programs and a filtered second plurality of SQL programs obtained in the previous iteration; testing, via the one or more hardware processors, the second semantic parser model on a PlotQA test data, wherein, the PlotQA test data comprising a plurality of Natural Language (NL) queries is provided as an input to obtain a corresponding plurality of SQL programs as an output; executing, via the one or more hardware processors, the obtained plurality of SQL programs to obtain a plurality of answers and comparing the obtained plurality of answers with a reference set of answers of the corresponding Natural Language (NL) queries to obtain a test data accuracy, until a difference of an output between a current iteration and a previous iteration reaches a predefined threshold; updating, via the one or more hardware processors, a second plurality of probabilities of a Probabilistic Context Free Grammar (PCFG) in the current iteration, if the test data accuracy in the current iteration is greater than a predefined threshold, from a first plurality of probabilities which are inversely proportional to the weights of one or more rules induced by the second plurality of SQL programs synthesized in the previous iteration and a subset of the first plurality of SQL programs comprised in the dataset; synthesizing, via the one or more hardware processors, a third plurality of SQL programs based on the updated second plurality of probabilities of the Probabilistic Context Free Grammar (PCFG) by: (i) sampling the third plurality of SQL programs using a Probabilistic Context Free Grammar (PCFG) sampling process; and (ii) substituting the sampled third plurality of SQL programs with the extracted data from the database of the corresponding one or more images specific to the one or more charts; feeding, via the one or more hardware processors, the synthesized third plurality of SQL programs to a backward model to generate a second plurality of Natural Language (NL) queries; filtering, via the one or more hardware processors, the generated second plurality of Natural Language (NL) queries to obtain a subset of the second plurality of Natural Language (NL) queries and a corresponding subset of the third plurality of SQL programs; filtering, via the one or more hardware processors, the obtained subset of the second plurality of Natural Language (NL) queries using a semantic based filtering technique to obtain one or more pairs of a third plurality of Natural Language (NL) queries and a corresponding fourth plurality of SQL programs by: (i) localizing a plurality of operators comprised in the subset of the second plurality of Natural Language (NL) queries and localizing a plurality of operators comprised in the corresponding subset of the third plurality of SQL programs; and (ii) comparing the localized plurality of operators comprised in the subset of the second plurality of Natural Language (NL) queries with the corresponding localized operator in the corresponding subset of the third plurality of SQL programs; and fine-tuning, via the one or more hardware processors, the first semantic parser model using the obtained one or more pairs of the third plurality of Natural Language (NL) queries and the corresponding fourth plurality of SQL programs and one or more pairs of the subset of the first plurality of Natural Language (NL) queries and the corresponding subset of the first plurality of SQL programs obtained from the filtered first plurality of SQL programs comprised in the dataset.

In another aspect, there is provided a system for program synthesis for weakly-supervised multimodal question answering using filtered iterative back-translation. The system comprises: a memory storing instructions; one or more communication interfaces; and one or more hardware processors coupled to the memory via the one or more communication interfaces, wherein the one or more hardware processors are configured by the instructions to: receive one or more images specific to one or more charts from a dataset and extracting data from the one or more images specific to the one or more charts by employing a computer vision pipeline, wherein the extracted data is stored in a schema of a database and wherein the one or more charts comprises a plurality of questions and a corresponding plurality of answers. The system further comprises iteratively performing: obtaining a first plurality of SQL programs corresponding to a first plurality of Natural Language (NL) queries using a trained first semantic parser model; executing the first plurality of SQL programs on the corresponding extracted data of the database to obtain a plurality of answers; comparing the plurality of answers for the first plurality of Natural Language (NL) queries corresponding to the obtained first plurality of SQL programs with a corresponding plurality of answers for the first plurality of Natural Language (NL) queries comprised in the dataset; filtering the first plurality of SQL programs corresponding to the first plurality of Natural Language (NL) queries based on the comparison, wherein the plurality of answers for the first plurality of Natural Language (NL) queries corresponding to the first plurality of SQL programs are matching with the corresponding plurality of answers for the first plurality of Natural Language (NL) queries comprised in the dataset; training a second semantic parser model using the filtered first plurality of SQL programs and a filtered second plurality of SQL programs obtained in the previous iteration; testing the second semantic parser model on a PlotQA test data, wherein, the PlotQA test data comprising a plurality of Natural Language (NL) queries is provided as an input to obtain a corresponding plurality of SQL programs as an output; executing the obtained plurality of SQL programs to obtain a plurality of answers and comparing the obtained plurality of answers with a reference set of answers of the corresponding Natural Language (NL) queries to obtain a test data accuracy, until a difference of an output between a current iteration and a previous iteration reaches a predefined threshold; updating a second plurality of probabilities of a Probabilistic Context Free Grammar (PCFG) in the current iteration, if the test data accuracy in the current iteration is greater than a predefined threshold, from a first plurality of probabilities which are inversely proportional to the weights of one or more rules induced by the second plurality of SQL programs synthesized in the previous iteration and a subset of the first plurality of SQL programs comprised in the dataset; synthesizing a third plurality of SQL programs based on the updated second plurality of probabilities of the Probabilistic Context Free Grammar (PCFG)by: (i) sampling the third plurality of SQL programs using a Probabilistic Context Free Grammar (PCFG) sampling process; and (ii) substituting the sampled third plurality of SQL programs with the extracted data from the database of the corresponding one or more images specific to the one or more charts; feeding the synthesized third plurality of SQL programs to a backward model to generate a second plurality of Natural Language (NL) queries; filtering the generated second plurality of Natural Language (NL) queries to obtain a subset of the second plurality of Natural Language (NL) queries and a corresponding subset of the third plurality of SQL programs; filtering the obtained subset of the second plurality of Natural Language (NL) queries using a semantic based filtering technique to obtain one or more pairs of a third plurality of Natural Language (NL) queries and a corresponding fourth plurality of SQL programs by: (i) localizing a plurality of operators comprised in the subset of the second plurality of Natural Language (NL) queries and localizing a plurality of operators comprised in the corresponding subset of the third plurality of SQL programs; and (ii) comparing the localized plurality of operators comprised in the subset of the second plurality of Natural Language (NL) queries with the corresponding localized operator in the corresponding subset of the third plurality of SQL programs; and fine-tuning the first semantic parser model using the obtained one or more pairs of the third plurality of Natural Language (NL) queries and the corresponding fourth plurality of SQL programs and one or more pairs of the subset of the first plurality of Natural Language (NL) queries and the corresponding subset of the first plurality of SQL programs obtained from the filtered first plurality of SQL programs comprised in the dataset.

In yet another aspect, there are provided one or more non-transitory machine-readable information storage mediums comprising one or more instructions which when executed by one or more hardware processors cause receiving one or more images specific to one or more charts from a dataset and extracting data from the one or more images specific to the one or more charts by employing a computer vision pipeline, wherein the extracted data is stored in a schema of a database and wherein the one or more charts comprises a plurality of questions and a corresponding plurality of answers; obtaining a first plurality of SQL programs corresponding to a first plurality of Natural Language (NL) queries using a trained first semantic parser model; executing the first plurality of SQL programs on the corresponding extracted data of the database to obtain a plurality of answers; comparing the plurality of answers for the first plurality of Natural Language (NL) queries corresponding to the obtained first plurality of SQL programs with a corresponding plurality of answers for the first plurality of Natural Language (NL) queries comprised in the dataset; filtering the first plurality of SQL programs corresponding to the first plurality of Natural Language (NL) queries based on the comparison, wherein the plurality of answers for the first plurality of Natural Language (NL) queries corresponding to the first plurality of SQL programs are matching with the corresponding plurality of answers for the first plurality of Natural Language (NL) queries comprised in the dataset; training a second semantic parser model using the filtered first plurality of SQL programs and a filtered second plurality of SQL programs obtained in the previous iteration; testing the second semantic parser model on a PlotQA test data, wherein, the PlotQA test data comprising a plurality of Natural Language (NL) queries is provided as an input to obtain a corresponding plurality of SQL programs as an output; executing the obtained plurality of SQL programs to obtain a plurality of answers and comparing the obtained plurality of answers with a reference set of answers of the corresponding Natural Language (NL) queries to obtain a test data accuracy, until a difference of an output between a current iteration and a previous iteration reaches a predefined threshold; updating a second plurality of probabilities of a Probabilistic Context Free Grammar (PCFG) in the current iteration, if the test data accuracy in the current iteration is greater than a predefined threshold, from a first plurality of probabilities which are inversely proportional to the weights of one or more rules induced by the second plurality of SQL programs synthesized in the previous iteration and a subset of the first plurality of SQL programs comprised in the dataset; synthesizing a third plurality of SQL programs based on the updated second plurality of probabilities of the Probabilistic Context Free Grammar (PCFG) by: (i) sampling the third plurality of SQL programs using a Probabilistic Context Free Grammar (PCFG) sampling process; and (ii) substituting the sampled third plurality of SQL programs with the extracted data from the database of the corresponding one or more images specific to the one or more charts; feeding the synthesized third plurality of SQL programs to a backward model to generate a second plurality of Natural Language (NL) queries; filtering the generated second plurality of Natural Language (NL) queries to obtain a subset of the second plurality of Natural Language (NL) queries and a corresponding subset of the third plurality of SQL programs; filtering the obtained subset of the second plurality of Natural Language (NL) queries using a semantic based filtering technique to obtain one or more pairs of a third plurality of Natural Language (NL) queries and a corresponding fourth plurality of SQL programs by: (i) localizing a plurality of operators comprised in the subset of the second plurality of Natural Language (NL) queries and localizing a plurality of operators comprised in the corresponding subset of the third plurality of SQL programs; and (ii) comparing the localized plurality of operators comprised in the subset of the second plurality of Natural Language (NL) queries with the corresponding localized operator in the corresponding subset of the third plurality of SQL programs; and fine-tuning the first semantic parser model using the obtained one or more pairs of the third plurality of Natural Language (NL) queries and the corresponding fourth plurality of SQL programs and one or more pairs of the subset of the first plurality of Natural Language (NL) queries and the corresponding subset of the first plurality of SQL programs obtained from the filtered first plurality of SQL programs comprised in the dataset.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Figure 1:
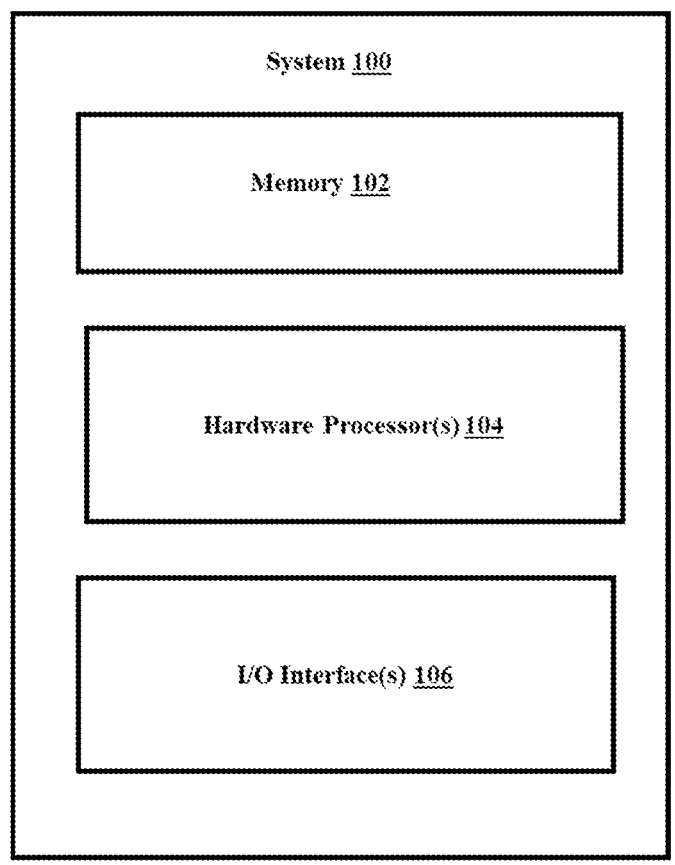
FIG. 1 illustrates an exemplary system for program synthesis for weakly-supervised multimodal question answering using filtered iterative back-translation, according to some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

The present disclosure provides a system and method for program synthesis for weakly-supervised multimodal question answering using filtered iterative back-translation. The present disclosure and the method described herein implement a two-stage approach where, in the first stage, a computer vision pipeline is employed to extract the data from one or more images specific to one or more charts and store it in a generic schema of a database. It is to be noted that, the extracted data in the form of schema of a database can be obtained from any source other than charts as well. For example, the extracted data can be obtained from sources including tables of Wikipedia, financial reports, scientific papers, and the like. In the second stage, Structured Query Language (SQL) programs for the Natural Language (NL) queries are generated in the dataset by using Filtered Iterative Back-Translation (FIBT). As a bootstrapping mechanism, the parameters of a forward (neural semantic parser) and a backward (language model) model are initialized using an available dataset of NL query-SQL program pairs. To adapt the forward and backward models to the required Natural Language (NL) queries, a Probabilistic Context-Free Grammar (PCFG) is defined, whose probabilities are set to be inversely proportional to the SQL programs in the training data and sample programs from it. Further, a compositional similarity-based filtration strategy is employed on the Natural Language (NL) queries generated for these programs by the backward model. The compositional similarity-based filtration strategy enables synthesizing, filtering, and appending Natural Language (NL) query-SQL program pairs to the training data, iteratively moving towards the required NL query distribution.

Referring now to the drawings, and more particularly to FIG. 1 through FIG. 4C, where similar reference characters denote corresponding features consistently throughout the figures, there are shown preferred embodiments and these embodiments are described in the context of the following exemplary system and/or method.

FIG. 1 illustrates an exemplary system 100 for program synthesis for weakly-supervised multimodal question answering using filtered iterative back-translation, according to some embodiments of the present disclosure. In an embodiment, the system 100 includes one or more processors 104, communication interface device(s) or input/output (I/O) interface(s) 106, one or more data storage devices or memory 102 operatively coupled to the one or more processors 104. The one or more processors 104 that are hardware processors can be implemented as one or more microprocessors, microcomputers, microcontrollers, digital signal processors, central processing units, state machines, graphics controllers, logic circuitries, and/or any devices that manipulate signals based on operational instructions. Among other capabilities, the processor(s) are configured to fetch and execute computer-readable instructions stored in the memory. In an embodiment, the system 100 can be implemented in a variety of computing systems, such as laptop computers, notebooks, hand-held devices, workstations, mainframe computers, servers, a network cloud and the like.

The I/O interface device(s) 106 can include a variety of software and hardware interfaces, for example, a web interface, a graphical user interface, and the like, and can facilitate multiple communications within a wide variety of networks N/W and protocol types, including wired networks, for example, LAN, cable, etc., and wireless networks, such as WLAN, cellular, or satellite. In an embodiment, the I/O interface device(s) can include one or more ports for connecting a number of devices to one another or to another server.

The I/O interface device(s) 106 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface device(s) can include one or more ports for connecting a number of devices to one another or to another server.

The memory 102 may include any computer-readable medium known in the art including, for example, volatile memory, such as static random-access memory (SRAM) and dynamic random access memory (DRAM), and/or non-volatile memory, such as read only memory (ROM), erasable programmable ROM, flash memories, hard disks, optical disks, and magnetic tapes. In an embodiment, one or more modules (not shown) of the system 100 can be stored in memory 102.

Figure 2:
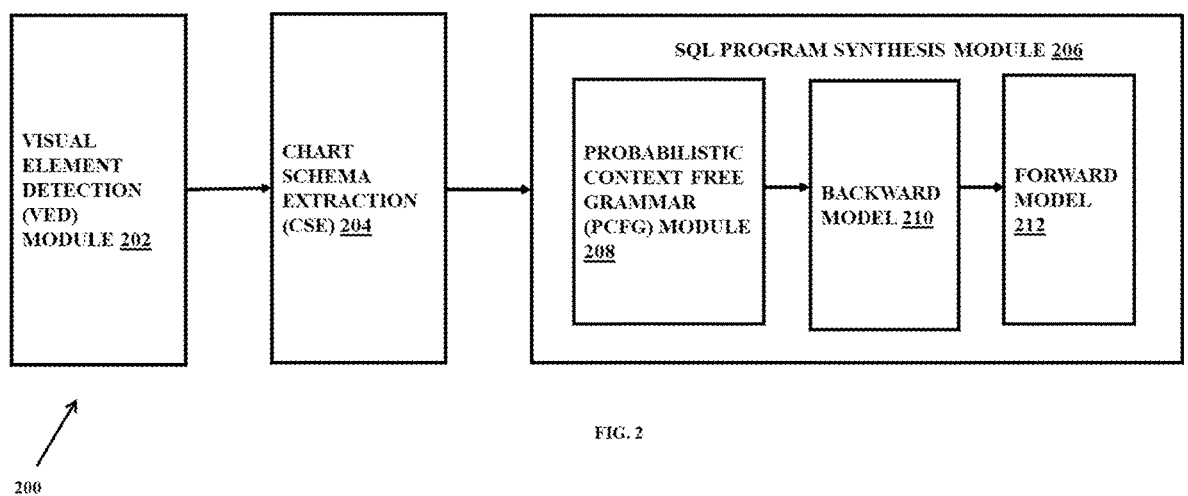
FIG. 2 is a functional block diagram of the system for program synthesis for weakly-supervised multimodal question answering using filtered iterative back-translation.

FIG. 2 is a functional block diagram of the system for program synthesis for weakly-supervised multimodal question answering using filtered iterative back-translation. In an embodiment, the system 200 includes a visual element detection (VED) module 202, a chart schema extraction (CSE) module 204 and a SQL program synthesis module 206. The SQL program synthesis module 206 comprise a Probabilistic context-free grammar (PCFG) module 208, a backward model 210 and a forward model 212.

Figure 3:
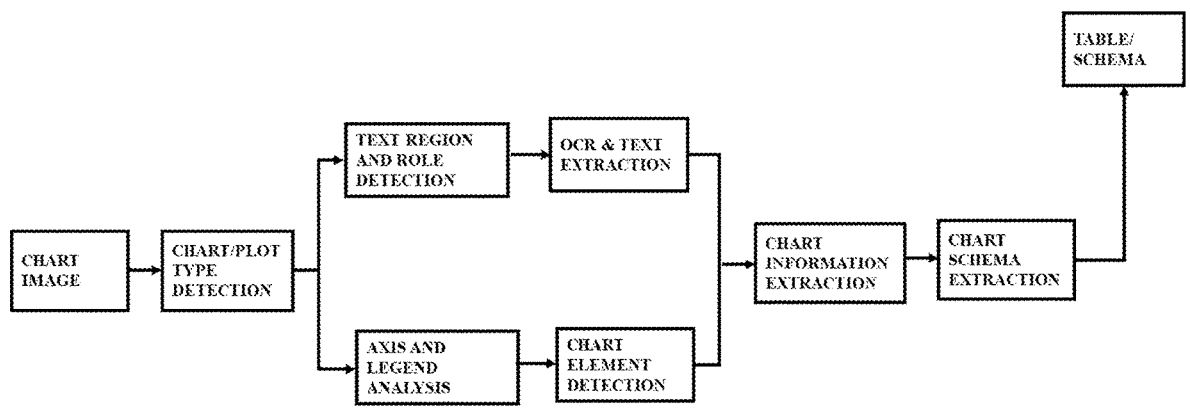
FIG. 3 is a functional block diagram illustrating the Visual Element Detection (VED) and chart Schema Extraction, according to some embodiments of the present disclosure.

FIG. 3 is a functional block diagram illustrating the Visual Element Detection and chart Schema Extraction, according to some embodiments of the present disclosure. The present disclosure extracts chart information using Visual Element Detection (VED), which consists of the following modules: (i) Chart/Plot Type Detection (Trained) (ii) Text Region and Role Detection (Trained) (iii) Axis and Legend analysis (Rule-Based) (iv) OCR and Text Extraction (Algorithm Based) (v) Chart Information extraction (Algorithm Based) as depicted in FIG. 3.

Chart/Plot Type Detection (depicted in FIG. 3): Since the chart types have distinct visual features, the present disclosure fine-tunes a Resnet-34 model (known in art) pretrained on ImageNet to detect chart types, using chart type labels provided by PlotQA dataset (known in art).

Text Region and Role Detection (depicted in FIG. 3): The text present in the one or more images specific to the one or more charts is detected by employing the Character-Region Awareness for Text Detection (CRAFT) model (known in art). However, Character-Region Awareness for Text Detection (CRAFT) frequently misses isolated characters and often yields partial detection of text regions. The text region and role detection (represented in FIG. 3) corrects partially detected text and segments out the corrected text region and identifies text-role labels (such as chart title, legend, X/Y-axis, and X/Y-tick labels) for the text regions. The architecture consists of two parts as described below:

(i) Encoder-Decoder Module: A U-net model architecture (known in art—Reference—https://analyticsindiamag.com/my-experiment-with-unet-building-an-image-segmentation-model/) is used for Encoder-Decoder Module which is comprised in the text region and role detection of FIG. 3. The latent representation for an image x obtained from the U-net encoder is $r=UNET_E(x)$. The encoder filters out irrelevant information by squeezing the feature map to a latent space. The output of the decoder for an image x is $o=UNET_D(r)$.

(ii) Trigger-Controller Module: The image x is appended along the channel dimension, along with the trigger patch p of a text region detected by the CRAFT, with highlighted patch contours, yielding an updated image $x_p$. With this input, the trigger module comprised in the trigger-controller module of the text region and role detection of FIG. 3, extracts features $t=GAP(NN_T(x_p))$, where $NN_T$ is a convolutional feature extractor followed by a Global Average Pooling (GAP) layer. The features of the trigger patch t are concatenated (∥) with the extracted encoder output features r, and are fed to the controller module comprised in the trigger-controller module of the text region and role detection of FIG. 3 to generate dynamic kernels $k=NN_C(GAP(r)\|(t)))$. The next part of the controller module is the dynamic head which contains three stacked 1×1 convolution layers, whose kernel weights are derived from k to get the final segmentation map s.

$s=(((o\cdot k_1)\cdot k_2)\cdot k_3)$ where · represents the convolution operation and $k_1$, $k_2$, $k_3$ are the weights of the dynamic kernel k distributed across the three convolutions. The dynamic kernel output k is given to a fully connected linear layer to determine the text role of the region. Thus, the trigger-controller module comprised in the text region and role detection of FIG. 3, exploits the spatial relationships between text roles to generate dynamic kernels and obtain text-role-specific segmentation maps from the decoded image.

The present disclosure uses the ground truth text-region and role labels provided by the PlotQA dataset. During inference, given a trigger patch p for an image x of a detected text-region belonging to an unknown text-role, the actual text-role classification output c and the segmentation map s of the text-region of that text-role are obtained. For example, these outputs may be obtained from a source connected to the system 100, such sources may include but are not limited to a computer vision network and the like. Trigger patches overlapping with detected text-role regions are removed before repeating the process for the remaining trigger patches. This process may lead to multiple segmentation maps for each text-role, over which a union operation is performed.

Axis and Legend Analysis (depicted in FIG. 3): The present disclosure uses an existing line detection algorithm (known in art) to identify the lines in the chart. The lines closest to the axis-tick-labels are identified as axis lines. The axis intersection coordinates are identified as the origin. The center of the axis-tick label regions and the axis-lines identify the coordinates of the axis ticks. A set-of predefined rules on the detected legend-labels are used to identify the location of the legend previews and their styles (color and pattern).

Chart Element Detection (depicted in FIG. 3): The axis-lines are used to identify the rectangular chart region. For each legend style, the bounding boxes of the matching chart elements are extracted from the identified chart region.

OCR (Optical character recognition) and Text Extraction (depicted in FIG. 3): Tesseract 4.0.0 (known in art) is used to extract text from the detected regions and store it with the corresponding roles.

Chart Information Extraction (depicted in FIG. 3): The visual elements detected from the modules (namely (i) Chart Type Detection (Trained) (ii) Text Region and Role Detection (Trained) (iii) Axis and Legend analysis (Rule-Based)

(iv) OCR and Text Extraction (Algorithm Based) (v) Chart Information extraction (Algorithm Based)) of the Visual Element Detection 202 are stored in a json format. There are four sections in the information/data extracted from the one or more charts: (i) Basic chart information in terms of file name, chart title, origin coordinates (ii) Legend dictionary, (iii) Axis, axis-tick labels, and their coordinates, (iv) Chart element bounding box coordinates and their styles.

Chart Schema Extraction (CSE) (depicted in FIG. 3): A schema (table) is extracted from the above available chart information (which includes (i) Chart Type Detection (Trained) (ii) Text Region and Role Detection (Trained) (iii) Axis and Legend analysis (Rule-Based) (iv) OCR and Text Extraction (Algorithm Based) (v) Chart Information extraction (Algorithm Based)) from the one or more charts namely the horizontal-bar charts, the dot charts, the vertical bar charts, and the line charts, by filtering noise and extracting the data series elements. Henceforth the following nomenclature is used, for the horizontal-bar charts X-axis is referred as the Numerical-axis and Y-axis is referred as the Categorical-axis. For the remaining chart types including dot, vertical bar chart, and line chart the nomenclature is reversed. Each legend label is called as a series.

Noise Correction of tick values: To handle false positive and false negative detection of Numerical-axis ticks, the mode (M) of differences is found between the (X/Y) coordinates for the consecutive ticks. The ticks are removed or added where the difference in the consecutive ticks is more or less than the mode, respectively. A dummy value 'x' is added for the newly added tick, if any, which is handled during correction. A non-numerical tick-value detection is removed, if any, by using M as an offset to the the neighboring tick value. To correct the tick-values not adhering to a progression followed by the majority values, a tick-value is considered as an 'anchor' (correct value) and other values are calculated by adding and/or subtracting M from this anchor. The 'gain' is computed with respect to this anchor to be the intersection of the extracted values and calculated values. This process is repeated by considering distinct numerical-axis values as anchors. For the 'anchor' giving the maximum 'gain', the corresponding calculated values are considered to be the correct set of numerical axis tick values. Some charts present in the dataset namely use scientific notation for denoting large numerical values which are converted to float values.

Data extraction: The present disclosure uses interpolation and extrapolation to calculate a numerical value associated with every pixel on the numerical-axis tick coordinate pixel as reference. For every data point (pivot-point in case of dots and line charts, bar-tops in case of bars) detected, the present disclosure assigns: (i) a series by matching it's with the category tick, and (ii) a category by matching its coordinate with the category tick, and (iii) a value of the pixel on the numerical axis whose coordinate matches with it. and (iii) a value of the pixel on the numerical axis whose coordinate matches with it. Thus, the data is extracted in the form of a set-of tuples. For the category for which no pivot point or bar is detected for a series due to Visual Element Detection (VED) errors, its value is considered to be zero. Finally, a tabular schema is defined with the column names as category axis label (category column), series (series column), and a string formed by concatenating the chart title with the numerical axis label (numerical column). All the spaces in the column names are replaced by underscores to make them SQL compatible. The extracted tuples are inserted as rows in the tabular schema. Charts containing only one series have a schema with only category and numerical columns. The chart schema tables are stored, extracted from chart images in the SQLite3 database to facilitate the execution of synthesized SQL programs (explained in later sections) on the schema. As 'Median' is not an in-built aggregation operation for SQLite3, a stored procedure is defined to perform the 'Median' as an aggregation operation.

Figure 4A:
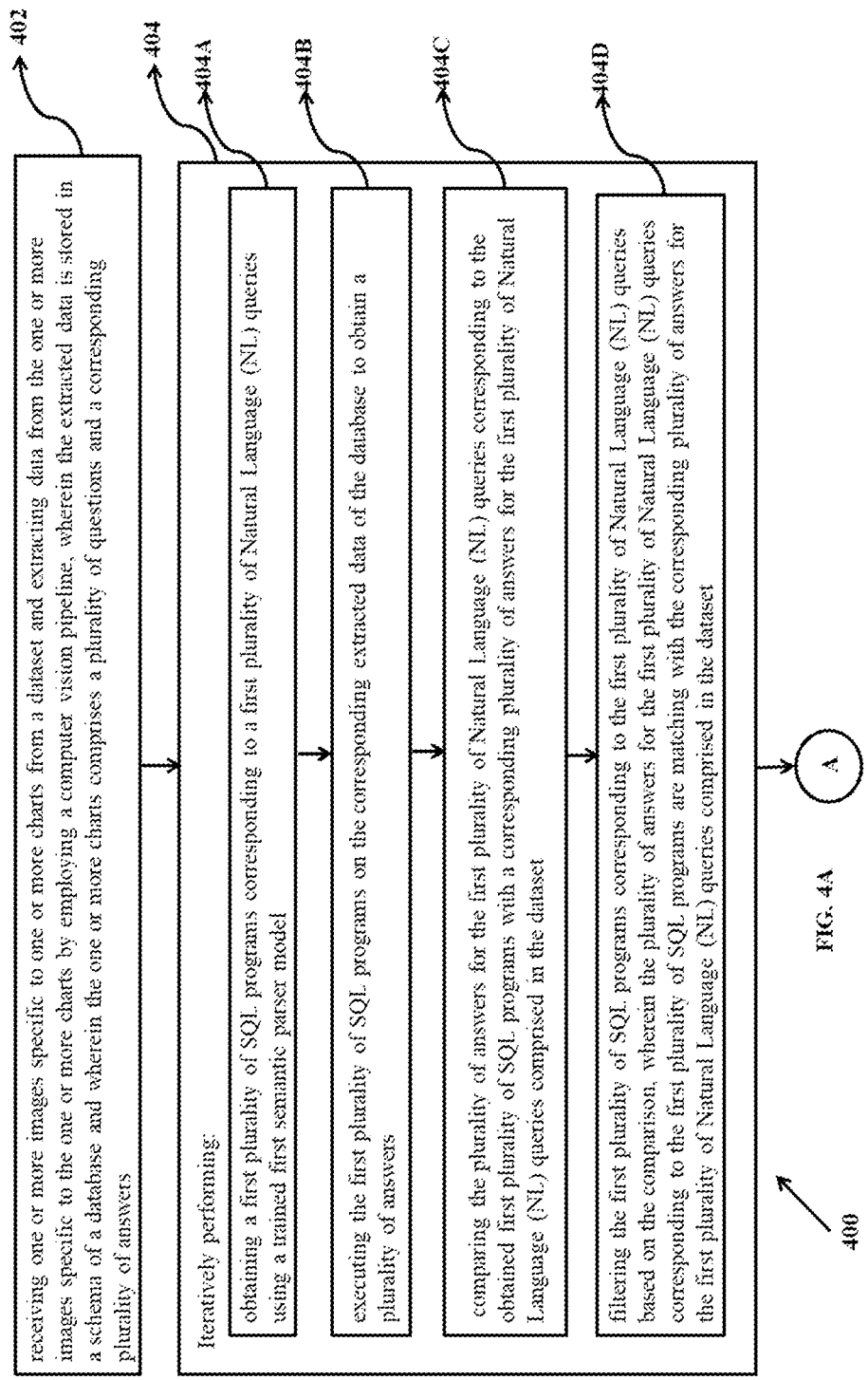
FIGS. 4A through 4C are flow diagrams illustrating the steps involved in the method for program synthesis for weakly-supervised multimodal question answering using filtered iterative back-translation, according to some embodiments of the present disclosure.
Figure 4B:
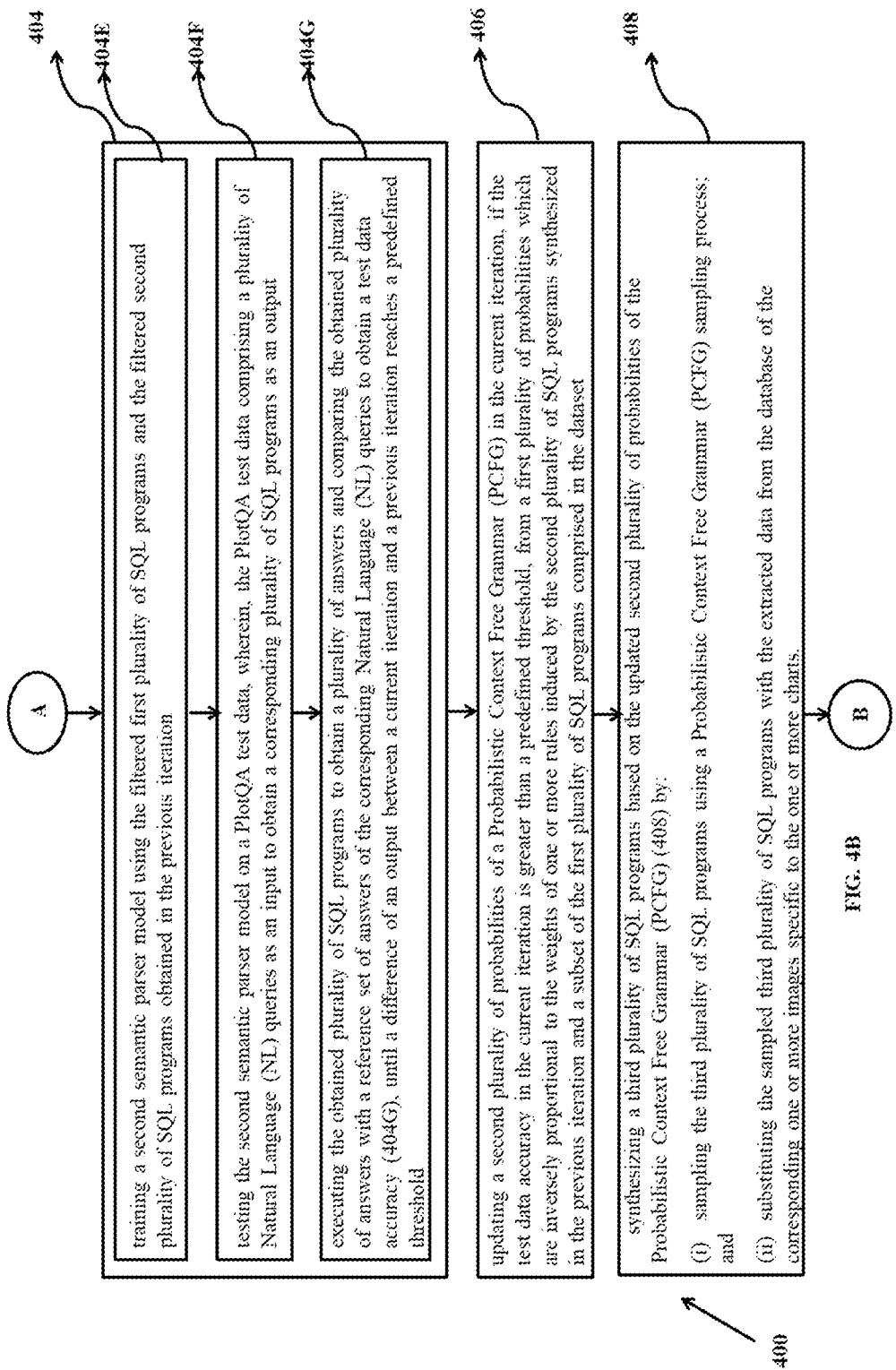
Figure 4C:
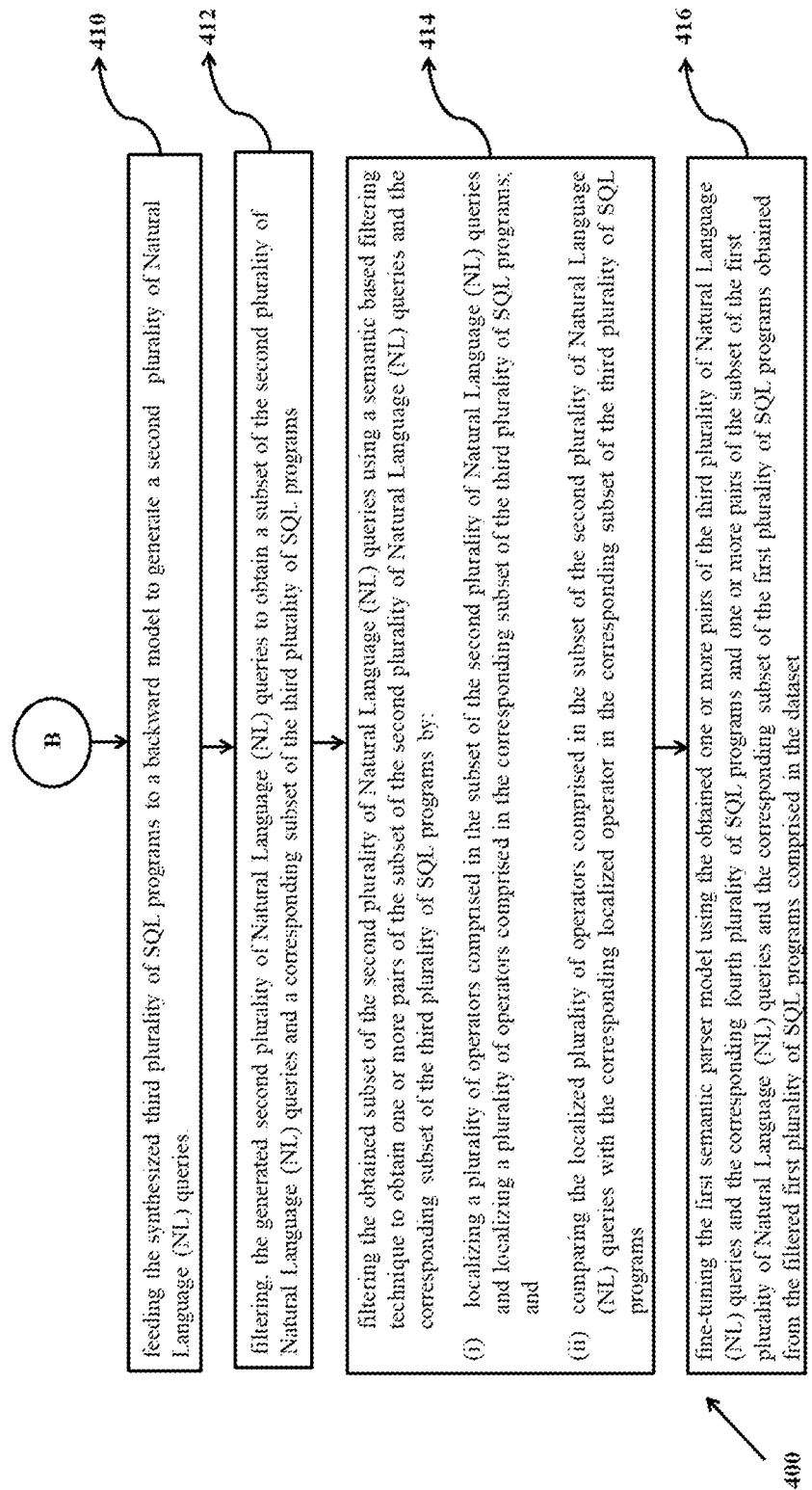

FIGS. 4A through 4C are flow diagrams illustrating the steps involved in the method for program synthesis for weakly-supervised multimodal question answering using filtered iterative back-translation using the system of FIG. 1, according to some embodiments of the present disclosure. Steps of the method of FIGS. 4A through 4C shall be described in conjunction with the components of FIG. 2. At step 402 of the method 400, the one or more hardware processors 104 receive one or more images specific to one or more charts from a dataset and extracting data from the one or more images specific to the one or more charts by employing a computer vision pipeline, wherein the extracted data is stored in a schema of a database and wherein the one or more charts comprises a plurality of questions and a corresponding plurality of answers represented by the visual element detection module 202 and the chart schema extraction module 204. Herein the extracted data includes (i) Basic chart information in terms of file name, chart title, origin coordinates (ii) Legend dictionary, (iii) Axis, axis-tick labels, and their coordinates, (iv) Chart element bounding box coordinates and their styles from the one or more charts namely the horizontal-bar charts, the dot charts, the vertical bar charts, and the line charts, by filtering noise and extracting the data series elements.

The present disclosure uses Spider (known in art) dataset augmented with a few (~360) NL-SQL query pairs as the bootstrapping dataset $D_{tr}$ to initialize the parameters of the forward $M_{NL->P}$ and backward $M_{P->NL}$ models of FIBT. Spider dataset is an open dataset of Natural Language (NL) Queries and Structured Query Language Program (SQL) pairs which is used to bootstrap a semantic parser model in understanding the Structured Query Language Program corresponding to different operations mentioned in the Natural Language (NL) Queries. The augmented query pairs are defined using templates to include the primitive operations (such as DIFFERENCE, RATIO, LESS THAN, etc.), required by the PlotQA Natural Language (NL) queries $q_{chart}$ but missing in the existing Spider dataset data queries. These query pairs are defined on a subset of Spider dataset schema tables, whose structure match with the extracted chart schema. For example, following is the templatized NL-SQL pair for the 'RATIO' operator: "What is the ratio of the numerical column name having categorical column value x to that of categorical column value y?"-"SELECT T1.numerical_column_name/T2.numerical_column_name FROM table_name T1, table_name T2 WHERE T1.categorical_column_name='categorical_column_value_x' AND T2.categorical_column_name='categorical_column_value_y'". Here the 'numerical column name' is the name of a column of a table belonging to a SPIDER database schema, having a numerical datatype. Similarly, 'categorical column name' is the column name of the same table with text datatype having 'categorical column value' x and y as its entries. As a result, the Natural Language (NL) queries of bootstrapping data $q_{tr}$ and the PlotQA data $q_{chart}$ share the same set-of primitive operations. An example for the templatized NL-SQL pair for the DIFFERENCE operator and RATIO operator each is depicted below.

Difference: NL Query: "what is the difference between the Season for Mike Duhaney Category:Articles with hCards in 1996.0 and Season for Michael Parkhurst Category:Articles with hCards in 2011.0?"
SQL Program: SELECT T1.Season-T2.Season FROM match_season T1, match_season T2 WHERE T1.Player='Mike Duhaney Category:Articles with hCards' AND T1.Season='1996.0' AND T2.Player='Michael Parkhurst Category:Articles with hCards' AND T2.Season='2011.0'
Ratio:
NL: what is the ratio of the Season for Maurice Edu Category:Articles with hCards to Season for Jonathan Bornstein Category:Articles with hCards
SQL: SELECT T1.Season/T2.Season FROM match_season T1, match_season T2 WHERE T1.Player='Maurice Edu Category:Articles with hCards' AND T2.Player='Jonathan Bornstein Category:Articles with hCards'

At step 404 of the method 400, the one or more hardware processors 104 iteratively perform the below mentioned steps. At step 404A of the method 400, the one or more hardware processors 104 obtain a first plurality of SQL programs corresponding to a first plurality of Natural Language (NL) queries using a trained first semantic parser model. Herein, the first plurality of SQL programs refers to "the programs obtained using the first semantic parser model corresponding to Natural Language (NL) queries comprised in the dataset" and the first plurality of Natural Language (NL) queries refers to the Natural Language (NL) queries comprised in the dataset (for which an answer is present (provided in the dataset)). Herein the "first semantic parser model" refers to the semantic parser model trained on the fourth plurality of SQL programs (which is nothing but, subset of the "subset of third plurality of SQL programs") and the third plurality of Natural Language (NL) queries (which is nothing but, subset of the "subset of the second plurality of Natural Language (NL) queries") pairs obtained after filtering the synthetic data (SQL programs synthesized in the previous iteration) along with NL-SQL pairs comprised in the training set of the dataset and Spider dataset to avoid catastrophic forgetting. At step 404B of the method 400, the one or more hardware processors 104 execute the first plurality of SQL programs on the corresponding extracted data of the database to obtain a plurality of answers. At step 404C of the method 400, the one or more hardware processors 104 compare the plurality of answers for the first plurality of Natural Language (NL) queries corresponding to the obtained first plurality of SQL programs with a corresponding plurality of answers for the first plurality of Natural Language (NL) queries comprised in the dataset. At step 404D of the method 400, the one or more hardware processors 104 filter the first plurality of SQL programs corresponding to the first plurality of Natural Language (NL) queries based on the comparison, wherein the plurality of answers for the first plurality of Natural Language (NL) queries corresponding to the first plurality of SQL programs are matching with the corresponding plurality of answers for the first plurality of Natural Language (NL) queries comprised in the dataset.

For example, Question: what is the difference between the replacement cost for HEARTBREAKERS BRIGHT in 269 and replacement cost for MIRACLE VIRTUAL in 193?
SQL: "SELECT T1.replacement_cost-T2.replacement_cost FROM film T1, film T2 WHERE T1.title='HEARTBREAKERS BRIGHT' AND T1.film_id='269' AND T2.title='MIRACLE VIRTUAL' AND T2.film_id='193'"

Given Answer: 66
Execution Answer: 66
This is match when Given Answer=Execution Answer Forward Pass (represented by the forward model 212 of 200): In an embodiment of the present disclosure, the forward model $M_{NL \rightarrow P}$ is trained with the training data $D_{tr}$ by feeding the flattened schema, the table contents, the Natural Language (NL) query with a separator token to the encoder and generate the SQL tokens at the output of the decoder in an auto-regressive fashion. The forward model is trained using the cross-entropy loss. Further the Natural Language (NL) queries $q_{rep}$ (also referred as first plurality of Natural Language (NL) queries) are fed from $D_{rep}$ (Representative data) to $M_{NL \rightarrow P}$ to generate the corresponding SQL programs (also referred as first plurality of SQL programs) ($p_{rep}$). These generated SQL programs (also referred as first plurality of SQL programs) are executed on the corresponding extracted chart schema $c_{rep}$. The SQL programs ((also referred as first plurality of SQL programs) which do not execute to the ground truth denotations are filtered, and the training data $D_{tr}$ is augmented by the remaining tuples.

At step 404E of the method 400, the one or more hardware processors 104 train a second semantic parser model using the filtered first plurality of SQL programs and the filtered second plurality of SQL programs obtained in the previous iteration. Herein, the second plurality of SQL programs refers to the SQL programs obtained in the previous iteration. Herein, the "second semantic parser model" refers to the semantic parser model trained on the training data comprised in the dataset obtained till the current iteration along with the Spider data. At step 404F of the method 400, the one or more hardware processors 104 test the second semantic parser model on a PlotQA test data, wherein, the PlotQA test data comprising a plurality of Natural Language (NL) queries is provided as an input to obtain a corresponding plurality of SQL programs as an output. It is to be noted that the proposed pipeline is trained on the PlotQA dataset, however the pipeline can be replicated for any other dataset having a similar structure (having schema, Natural Language (NL) Query and the answer available). At step 404G of the method 400, the one or more hardware processors 104 execute the obtained plurality of SQL programs to obtain a plurality of answers and comparing the obtained plurality of answers with a reference set of answers of the corresponding Natural Language (NL) queries to obtain a test data accuracy, until a difference of an output between a current iteration and a previous iteration reaches a predefined threshold.

In the second stage of the present approach/method, a Filtered Iterative Back Translation (FIBT) (Algorithm 1) is used to synthesize SQL programs (represented by the SQL program synthesis module 206 of 200) for the Natural Language (NL) queries (questions) a $q_{chart}$, in the absence of the program annotations. The output of the Filtered Iterative Back Translation (FIBT) is the neural semantic parser $M_{NL \rightarrow P}$, which is used to generate SQL programs for all the reasoning type of Natural Language (NL) queries in PlotQA test set/dataset. The generated SQLs are executed on the test set chart schema $c_{chart}$, extracted from the corresponding chart image, to compute the final answer. This answer is compared with the ground truth answer provided in the dataset $a_{chart}$ to get the results in terms of test accuracy.

| | Algorithm 1: Filtered Iterative Back Translation (FIBT) |
|---|---|
| Input | : Dataset $D_{chart} = \{q_{chart}, c_{chart}, a_{chart}\}_1^N$, where: $c_{chart}$ = chart schema; $q_{chart}$ = NL queries posed on charts; $a_{chart}$ = answers to NL queries. Defined PCFG which model query compositions on $c_{chart}$ |
| Output | : Trained Neural Semantic Parser $M_{NL \to P}$ |
| Initial Stage | : Initialize training dataset with bootstrapping data $D_{tr} = \{s_{tr}, q_{tr}, p_{tr}\}_1^M$, where $s_{tr}$ = Database schema; $q_{tr}$ = NL queries posed on the schema; $p_{tr}$ = equivalent SQL programs. Equivalent SQL programs of $q_{chart}$ and $p_{tr}$ share primitive operations. Cluster generalize ($q_{chart}$) to get representative NL queries $q_{rep} \subset q_{chart}$ and $D_{rep} = (q_{rep}, c_{rep}, a_{rep})_1^n$ where $n \ll N$ $p_{filter} = \Phi$ |

```
1  While M_{NL -> P} and M_{P -> NL} have not converged do
2      Train M_{NL -> P} on D_{tr} // Forward Pass
3      Feed q_{rep} to M_{NL -> P} to generate SQL programs p_{rep}
4      Execute p_{rep} on schema c_{rep} to compute a_c
5      if a_c == a_{rep} // Filter
6      then
7          Add (c_{rep}, q_{rep}, p_{rep}) to D_{tr} // Augment
8          Remove (c_{rep}, q_{rep}, p_{rep}) from D_{rep}
9      end if
10     Train M_{P -> NL} on D_{tr} // Backward Pass
11     Induce inverse probabilities of the PCFG using queries (p_{tr} +
       p_{filter}) and heuristics in the Equation 1.
12     Sample SQL programs p_{syn} on c_{chart} from PCFG.
13     Feed p_{fsyn} to M_{P -> NL} to generate q_{synth}
14     filter_flag = 1
15     if max_sim(generalize( q_{synth}) , generalize (q_{rep}) ) >
       threshold // Filter1
16     then
17         if look_up( q_{synth}, p_{synth}) // Filter2
18         then
19             Add (c_{chart}, q_{synth}, p_{synth}) to D_{tr} // Augment
20             filter_flag = 0
21         end if
22     end if
23     if filter_flag == 1 then
24         Add p_{synth} to p_{filter}
25     end if
26 end while
```

At step 406 of the method 400, the one or more hardware processors 104 update a second plurality of probabilities of a Probabilistic Context Free Grammar (PCFG) (represented by the Probabilistic context-free grammar (PCFG) module 208 of 200) in the current iteration, if the test data accuracy in the current iteration is greater than a predefined threshold, from a first plurality of probabilities which are inversely proportional to the weights of one or more rules induced by the second plurality of SQL programs synthesized in the previous iteration and a subset of the first plurality of SQL programs comprised in the dataset. In an embodiment of the present disclosure, the predefined threshold must be less than or equal to 0.5%. At step 408 of the method 400, the one or more hardware processors 104 synthesize a third plurality of SQL programs based on the updated second plurality of probabilities of the Probabilistic Context Free Grammar (PCFG) by:

(i) sampling the third plurality of SQL programs using a Probabilistic Context Free Grammar (PCFG) sampling process; and (ii) substituting the sampled third plurality of SQL programs with the extracted data from the database of the corresponding one or more images specific to the one or more charts.

Herein the third plurality of SQL programs refers to the SQL programs synthesized using PCFG and substitution.

Probabilistic Context Free Grammar (PCFG): The present disclosure defines PCFG depicted below, as a subset of the SQL grammar to model all possible SQL program compositions for the PlotQA Natural Language (NL) queries.

| | | |
|---|---|---|
| sql | $\to$ | sel_num_col \| sel_col \| sel_arth |
| sel_num_col | $\to$ | "SELECT" agg "(" "num_col_name" ")" from "WHERE" cond_series \| cond_cat |
| sel_col | $\to$ | sel_cat_col \| sel_series_col "WHERE" cond_num ("AND" cond_series \| cond_cat)$^{0-1}$ |
| sel_col | $\to$ | sel_cat_col \| sel_series_col "ORDER" "BY" "num_col_name" "DESC" \| "ASC" "LIMIT" "1" |

| | |
|---|---|
| sel_cat_col from | "SELECT" "DISTINCT" (COUNT)$^{0-1}$ "(" "cat_col_name" ")" |
| sel_series_col ")" from | →"SELECT" "DISTINCT" (COUNT)$^{0-1}$ "(" "series_col_name" |
| sel_arth | → "SELECT" agg "(" "num_col_name" ")" arth agg "(" "num_col_name" ")" from ( "WHERE" cond_series \| cond_cat)$^{0-1}$ |
| sel_arth | → "SELECT" "DISTINCT" "(" "t1." "num_col_name" arth "t2." "num_col_name" ")" from_2 "WHERE" "t1." cond_cat \| cond_series "AND" "t2." cond_cat \| cond_series ("AND" "t1." cond_series \| cond_cat"and" "T2." cond_series \| cond_cat)$^{0-1}$ |
| sel_arth | → "SELECT" "DISTINCT" "(" "t1." "num_col_name" arth "t2." "num_col_name" ")" arth agg "(" "t3." "num_col_name" ")" from_2 "," "table_data" "t3" "WHERE" "t1." cond_cat "AND" "t2." cond_cat ("AND" "t1." cond_series"AND""t2." cond_series"AND" "t3." cond_series )$^{0-1}$ |
| sel_arth | → "SELECT" "DISTINCT" "(" "t1." "num_col_name" arth "t2." "num_col_name" ")" arth agg "(" "t3." "num_col_name" arth "t4." "num_col_name" ")" from_2 from_4 "WHERE" "t1." cond_series \| cond_cat "AND" "t2." cond_series \| cond_cat "AND" "t3." cond_series \| cond_cat "AND" "t4." cond_series \| cond_cat |
| from | →"FROM" "table_data" |
| from_2 | →"FROM" "table_data" "AS" "t1" "," "table_data" "AS" "t2" |
| from_2 | →"FROM" "table_data" "AS" "t1" "JOIN" "table_data" "AS" "t2" "ON" "t1." "cat_col_name" \| "series" "=" "t2." "cat_col_name" \| "series" |
| from_4 | →"," "table_data" "t3" "," "table_data" "t4" |
| cond_num | → "num_col_name" op "num_val" \| op "("sel_num_col")" \| "NOT" "IN" "("sel_num_col")" |
| cond_cat | → "cat_col_name" "=" """cat_col_val""" \| "series" "IN" "(" sel_series_col ")" |
| agg | → "SUM" \| "MIN" \| "MAX" \|"AVG" \| "MEDIAN" |
| arth | → "<" \| ">" \| "−" \| "+" |
| op | → "=" \| "<" \| ">" |

Probabilistic Context Free Grammar (PCFG)

TABLE 2

PlotQA V2 Dataset Statistics.

| | Images | | Questions | | |
|---|---|---|---|---|---|
| Split | Total | R* | Total | Reasoning | R* |
| Train | 157,070 | 12,934 | 20,249,479 | 16,593,656 | 69,000 |
| Valid | 33,650 | 3,110 | 4,360,648 | 3,574,081 | 13,740 |
| Test | 33,657 | — | 4,342,514 | 3,559,392 | — |
| Total | 224,377 | 16,044 | 28,952,641 | 23,727,129 | 82,740 |

R*: Number of Representative images ($c_{rep}$) and questions ($q_{rep}$) used for FIBT Query Sampling: As depicted in Table 2, PlotQA has ~16.6 million reasoning-based training queries. From a compute perspective it is not efficient to train the semantic parser model with all the queries. Hence, representative queries are collected from PlotQA. 200K Natural Language (NL) queries were randomly sampled from the PlotQA training set. The generalize operations is performed to replace schema specific information in the Natural Language (NL) queries with generalized tokens and thus to transform each Natural Language (NL) query to highlight it's the composition or structure. The schema related entity (column headings) and values (column values) in the Natural Language (NL) query are replaced with more generic <entity> and <value> tags using sub-string matching. For example, the reasoning query, depicted in Table 1 for (a) Dot Charts, is modified to: 'Is the difference between <entity_num> on <value_series> in <value_category> and <value_category> greater than the difference between <entity_num> on <value_series> in <value_category> and <value_category>?', where 'the difference between the amount collected as tax' being a sub-string of the numerical column name, gets replaced with the generic token <entity_num> and the values of the category column, viz. '2003', '2007' and the series column 'goods' and 'exports' gets replaced with <value_category> and <value_series>, respectively. The representations of these generalized Natural Language (NL) query (also referred as second plurality of Natural Language (NL) queries) sentences were extracted using sentence-BERT (Bidirectional Encoder Representations from Transformers) technique and clustered using a Density-based spatial clustering of applications with noise (DBSCAN) algorithm with cosine similarity as the similarity metric. As the DBSCAN allows to cluster data without specifying the number of clusters in advance, with minpoints=15 and $\epsilon$=0.25 345 clusters were obtained. Further 200K Natural Language (NL) queries were randomly selected from each cluster to get 69K representative Natural Language (NL) queries. The corresponding original Natural Language (NL) queries $q_{rep}$ were fetched for these 69K queries along with the corresponding schema $c_{rep}$ and answers $a_{rep}$ to form a dataset of representative queries $D_{rep}$. Similar sampling strategy was applied on validation split. The number of representative Natural Language (NL) queries and schema (images) used for FIBT are showcased in Table 2.

At step 410 of the method 400, the one or more hardware processors 104 feed the synthesized third plurality of SQL programs to a backward model to generate a second plurality of Natural Language (NL) queries represented by the backward model 210. Herein the second plurality of Natural Language (NL) queries refers to the Natural Language (NL) queries generated by the backward model when given third plurality of SQL programs as input. For example, SQL:

SELECT T1.replacement_cost-T2.replacement_cost FROM film T1, film T2 WHERE T1.title='HEARTBREAKERS BRIGHT' AND T2.title='MIRACLE VIRTUAL'
Output: what is the difference between the replacement cost for HEARTBREAKERS BRIGHT and replacement cost for MIRACLE VIRTUAL".

Backward Pass: The present disclosure trains the backward model $M_{P->NL}$ with the current training data $D_{tr}$ by feeding the flattened schema and the contents followed by the SQL program (also referred as third plurality of SQL programs) with a separator token to the encoder and generating the Natural Language (NL) (also referred as second plurality of Natural Language (NL) queries) tokens at the output of the decoder in an auto-regressive fashion. To synthesize and augment training data with the Natural Language (NL) queries which match the PlotQA query distribution, the PCFG sampling process is used to sample SQL programs (also referred as third plurality of SQL programs) and the rules in the PCFG complement the type of SQL programs required to answer the Natural Language (NL) queries comprised in the dataset. Existing approaches of SQL synthesis by sampling from a grammar, induce probabilities of a pre-defined PCFG using a few-shot SQL programs on a database. This helps in synthesizing SQL programs of similar compositions for that database. However, in the present approach, the focus is more on synthesizing SQL programs, whose compositions and domains (i) belong to the distribution of SQL programs for the Natural Language (NL) queries in PlotQA (ii) but are not covered by the current training data $D_{tr}$. To achieve this, the probabilities of the pre-defined PCFG were induced to be inversely proportional to the probabilities induced by already existing SQL programs p tr (also referred as a subset of the first plurality of SQL programs comprised in the dataset) in the training set $D_{tr}$, along with the second plurality of SQL programs synthesized in the previous iteration. Here, the filtered SQL programs are the ones whose Natural Language (NL) queries do not follow the plotQA NL query distribution. To induce the inverse probabilities $P_{inv}$ for each of the production rules R in the PCFG, heuristics depicted in Equation 1 is used.

$$P_{inv}(R) = \frac{W_t(R)}{\Sigma_{RHS(r)=RHS(R)} W_t(r)} \quad (1)$$

$$\text{Where } W_t(R) = \left(\frac{MAX_{RHS(r)=RHS(R)}(P(r))}{P(R)}\right)^{1-\alpha}$$

where P(R) gives the probability with which a rule R is triggered by the set of queries taken into consideration and RHS (R) is the Right-Hand Side of the production rule R. Thus, RHS (r)=RHS (R) provides the set of all production rules which share the source node (RHS) with the rule R. $\alpha$ is the hyper-parameter which controls the skewedness of the distribution. Lower the values of $\alpha$ more skewed is the distribution. Value of $\alpha$ was set to 0.8.

At step 412 of the method 400, the one or more hardware processors 104 filter the generated second plurality of Natural Language (NL) queries to obtain a subset of the second plurality of Natural Language (NL) queries and a corresponding subset of the third plurality of SQL programs. At step 414 of the method 400, the one or more hardware processors 104 filter the obtained subset of the second plurality of Natural Language (NL) queries using a semantic based filtering technique to obtain one or more pairs of a third plurality of Natural Language (NL) queries and a corresponding fourth plurality of SQL programs by:
(i) localizing a plurality of operators comprised in the subset of the second plurality of Natural Language (NL) queries and localizing a plurality of operators comprised in the corresponding subset of the third plurality of SQL programs; and
(ii) comparing the localized plurality of operators comprised in the subset of the second plurality of Natural Language (NL) queries with the corresponding localized operator in the corresponding subset of third plurality of SQL programs;
Herein the third plurality of Natural Language (NL) queries refers to the subset of the "subset of the second plurality of Natural Language (NL) queries" and the fourth plurality of SQL programs refers to the subset of the "subset of third plurality of SQL programs".

At step 416 of the method 400, the one or more hardware processors 104 fine-tune the first semantic parser model using the obtained one or more pairs of the third plurality of Natural Language (NL) queries and the corresponding fourth plurality of SQL programs and the one or more pairs of the subset of the first plurality of Natural Language (NL) queries and the corresponding subset of the first plurality of SQL programs obtained from the filtered first plurality of SQL programs comprised in the dataset.

In an embodiment of the present disclosure, the SQL programs (also referred as third plurality of SQL programs) synthesized using the PCFG ($p_{synth}$) are fed to the backward model $M_{P->NL}$ to generate the corresponding Natural Language (NL) queries (also referred as second plurality of Natural Language (NL) queries) $q_{synth}$. The present disclosure i) transforms $q_{synth}$ by using the generalize operation, explained in section Query Sampling, (ii) extracts the representation for $q_{synth}$ using sentence Bidirectional Encoder Representations from Transformers (BERT) and (iii) compares the representation with the generalized representative queries ($q_{rep}$) using cosine similarity. Further Natural Language (NL) queries having their maximum similarity score (max_sim) below a threshold are filtered. The SQL programs (also referred as subset of the third plurality of SQL programs) corresponding to the filtered Natural Language (NL) queries (also referred as subset of the second plurality of Natural Language (NL) queries) are added to $p_{filter}$, representing SQL programs not following PlotQA distribution. With this filtering, it is observed that still some Natural Language (NL) queries (subset of the second plurality of Natural Language (NL) queries) with semantic noise, meaning the semantics of the NL queries $q_{synth}$ (also referred as subset of the second plurality of Natural Language (NL) queries) and the corresponding SQL programs $p_{synth}$ (also referred as subset of the third plurality of SQL programs) do not match. One of the existing approaches used semantics of Natural Language (NL) queries (phrases) to estimate the operator candidates in the corresponding programs and thus reduced the search space of the semantic parser. The present disclosure uses a similar technique of phrase-operator look-up to further filter the synthetic query pairs (also referred as a pair of subset of the second plurality of Natural Language (NL) queries and a corresponding subset of the third plurality of SQL programs). Given a $q_{synth}$, $p_{synth}$ pair the look-up operation returns 'False' if the pre-defined (set-of) phrase(s) in Natural Language (NL) query ($q_{synth}$) (also referred as subset of the second plurality of Natural Language (NL) queries) do(es) not match with the (set-of) operator(s) in the corresponding SQL programs ($p_{synth}$) (also referred as subset of the third plurality of SQL programs)

and returns 'True' otherwise. This matching is done following the pre-defined look-up dictionary with the phrase-operator mappings between the Natural Language (NL) queries (also referred as subset of the second plurality of Natural Language (NL) queries) and the SQL programs (also referred as subset of the third plurality of SQL programs) (as depicted in Table 3). This filtering helps to remove the semantically incorrect Natural Language (NL) queries (also referred as subset of the second plurality of Natural Language (NL) queries) ($q_{synth}$), which have been generated by the backward model $M_{P->NL}$ for the synthetic SQL programs ($p_{synth}$) (also referred as (also referred as subset of the third plurality of SQL programs). With this two-level filtering, the training data $D_{tr}$ is augmented with the remaining synthetic data. These synthetic queries which are not present in the existing training set but are having structure similar to the PlotQA queries, helps in adapting the models to answer PlotQA queries. This augmented training set $D_{tr}$ is further used to train the first semantic parser model in the next iteration.

TABLE 3

Semantic mapping of NL Phrases and SQL Operators

| NL Phrase | | SQL Operator |
|---|---|---|
| ratio | ↔ | / |
| difference | ↔ | - |
| greater than | ↔ | > |
| less than | ↔ | < |
| total OR sum | ↔ | +OR SUM |
| maximum OR highest | ↔ | MAX |
| minimum OR lowest | ↔ | MIN |
| average | ↔ | AVG |
| how many | ↔ | COUNT |
| median | ↔ | MEDIAN |

In an embodiment of the present disclosure, for every iteration the above defined threshold for similarity-based query filtering is automatically set. Out of a pre-defined set-of values ranging from 0.90 to 0.98 in increments of 0.01, the threshold is set to a value which provides minimum KL-divergence between the query distribution over the operators in (i) the original plotQA training set queries and (ii) the synthetic queries getting augmented to the training set after filtering ($q_{synth}$-$q_{filter}$).

Training Details with respect to the present disclosure are explained below:
Visual Element Detection Models: For the chart type classification ResNet-34 was fine-tuned for 2000 steps. Adam optimizer was used in the present disclosure, which had a learning rate of 0.0005, and a batch size of 8. The ResNet-34 yielded 99.91% test accuracy. For text region and role detection, a pre-trained VGG19 was used and trained with a batch size of 8, for 1 epoch, using the Adam optimizer with an initial learning rate of 0.0005. As the data was skewed for axes-labels, while creating training tuples, the present disclosure under-sample for this text-role to avoid class imbalance.

Forward and Backward models of FIBT CodeT5 (known in art) provided best results on Spider dataset in terms of execution accuracy. For chart question answering, more interest was given to correctly compute the final answer (execution accuracy) than the intermediate logical form (exact match accuracy). Thus, CodeT5 based neural semantic parser was chosen as the forward model $M_{NL->SQL}$ and CodeT5 based code summarization model 6 was chosen as the backward model $M_{SQL->NL}$ in the present disclosure. The second semantic parser model was fine-tuned until the validation loss does not decrease for more than 3 consecutive epochs (stopping criterion) with a batch size of 48 and a learning rate of 0.0001 using the Adam optimizer on an NVIDIA® Tesla V100 32 GB GPU (NVIDIA Tesla is a variant of a GPU series offered by NVIDIA®).

Evaluation Metric: For chart extractions mean Average Precision (mAP) @0.90 Intersection over Union (IOU) was preferred over mAP @0.75 IOU as an evaluation metric as precise fine-grained extractions were required. The acceptable error margin was very small as the resulting data errors can propagate to the downstream schema generation and reasoning tasks. For Optical character recognition (OCR) accuracy (1—Word Error Rate (WER)) was used as the evaluation metric. For the reasoning task, test accuracy was used as the evaluation metric, where for binary (yes/no) and textual answers the model's output was considered to be correct only if the predicted answer exactly matches the ground truth answer. However, for numeric answers with floating point values, an answer was considered to be correct if it is within the 5% range of the correct answer.

TABLE 4

Chart Extractions on the PlotQA dataset with mAP scores (in %).

| IOU | | | | | @0.90 | | | | | | @0.75 | @0.50 |
|---|---|---|---|---|---|---|---|---|---|---|---|---|
| Existing models | Bar | Dot-Line | Leg Lbl | Leg PV | Title | X-Lbl | X-Ticks | Y-Lbl | Y-Ticks | mAP | mAP | mAP |
| FrCN N (FPN+ RA) | 87.89 | 31.62 | 79.05 | 66.39 | 0.22 | 69.78 | 88.29 | 46.63 | 84.60 | 61.57 | 69.82 | 72.18 |
| FrCN N (RA) | 63.86 | 14.79 | 70.95 | 60.61 | 0.18 | 83.89 | 60.76 | 93.47 | 50.87 | 55.49 | 89.14 | 96.80 |
| FrCN N (FPN+ RA) | 85.54 | 27.86 | 93.68 | 96.30 | 0.22 | 99.09 | 96.04 | 99.46 | 96.80 | 77.22 | 94.58 | 97.76 |
| PlotNet | 92.80 | 70.11 | 98.47 | 96.33 | 99.52 | 97.31 | 94.29 | 97.66 | 94.48 | 93.44 | 97.93 | 98.32 |
| Ours (Train: All) | 89.67 | 69.13 | 99.89 | 98.67 | 99.99 | 99.90 | 99.45 | 99.89 | 97.69 | 94.92 | 95.80 | 96.70 |
| Ours (Train: 4K) | 89.67 | 69.13 | 96.31 | 96.31 | 99.63 | 96.35 | 96.84 | 99.48 | 96.58 | 92.86 | 93.66 | 94.50 |

Leg: Legend, Lbl: Labels, PV: Preview

Chart Extraction Results: Table 4 illustrates the State-of-the-Art results obtained by the VED module of the present approach with 94.92% mAP @0.90 IOU when trained with 157K images, beating the baseline [8] by 1.48% mAP @0.90 IOU. Under real-world settings, it was very unlikely to have this many annotated images for every new chart-type. With the VED approach, comparable results with only 2.5% (~1 K per chart-type) of the training samples are obtained. The extraction of dot/line regions was still challenging because of their small size and sparse distribution. It was observed that the extractions of this approach primarily failed in cases where the dots or lines were eclipsed or intersected by the dots or lines of other series.

Table 5 depicts the results of the Optical character recognition (OCR) module of the proposed approach. The correctly segmented text-regions by the proposed text-region and role detection model, followed by OCR outperform the baseline from PlotQA (known in art), yielding State-of-the-Art results.

TABLE 5

OCR Module Accuracy

| Method | PlotQA | Present method (method of the present disclosure) |
|---|---|---|
| Title | 94.60 | 99.69 |
| X-axis Label | 95.50 | 99.73 |
| Y-axis Label | 97.07 | 99.59 |
| Legend Labels | 91.11 | 98.13 |
| X-tick Labels | 91.38 | 97.62 |
| Y-tick Labels | 88.07 | 95.94 |

Chart Question Answering results: Table 6 illustrates the results of the Q & A task over reasoning-based queries in the PlotQA V2 test set (3.56 M NL queries on ~33.6 charts). The proposed weakly supervised approach surpasses the baselines (PlotQA (known in art) and T5 (known in art)) by a large margin even exceeding the human baseline. As mentioned in one of the existing approaches most human errors are due to numerical precision as it is difficult to manually identify the exact value from the chart even within a 5% margin. The vision pipeline used in the present disclosure allows to achieve precise numerical detections facilitating better results for the down-stream reasoning task. Improvement in test accuracy results from 39.69% to 57.45% to 60.44% in the $1^{st}$, $2^{nd}$ and $3^{rd}$ iterations, respectively, demonstrates the efficacy of the filtered iterative back-translation (FIBT) approach with the filtering and augmentation mechanisms used for capturing the relevant query compositions.

TABLE 6

Results on PlotQA V2 Reasoning Queries (% Test Accuracy), ANS: Answer, YN: Yes/No, FV: Fixed Vocabulary, OV: Open Vocabulary, ES: Extracted Schema, OS: Oracle Schema

| ANS Type | Test Queries | Human | Plot QA | T5 | Present ES | Present OS |
|---|---|---|---|---|---|---|
| YN | 72,968 | 76.51 | 62.75 | 62.38 | 43.21 | 44.13 |
| FV | 566,655 | 59.97 | 7.95 | 2.41 | 63.91 | 67.70 |
| OV | 2,919,769 | 58.01 | 14.95 | 0.003 | 60.42 | 85.35 |
| Total | 3,559,392 | 58.70 | 14.82 | 1.17 | 60.44 | 84.49 |

As per the definition provided by the authors of PlotQA (known in art), the fixed vocabulary comprises of the set of top 1000 frequently occurring answer words. The method of the present disclosure yields superior performance for fixed vocabulary (FV) and open vocabulary (OV) answers. The SQL programs for the Natural Language (NL) queries with yes/no (binary) type of answers are very complex, involve nesting, and are harder to synthesize. Some of the prior approaches handled queries with binary, Fixed Vocabulary (FV) or Open Vocabulary (OV) answers in a distinct manner and require a query classifier to depict the type of query to further feed to distinct models for each type. They also have to maintain these multiple models. On the other hand, the method of the present disclosure has an advantage of one solution for all types of Natural Language (NL) queries. However, as opposed to prior end-to-end approaches, for some cases the generated SQL program for queries with binary answers does not yield a binary result. This leads to lower performance for yes/no type of queries for the proposed approach. As SQL programs are generated for the NL queries, the proposed approach is more interpretable, allowing the user to understand the reasoning steps which have been followed to get the final answer.

ChartQA (known in art) provided results on PlotQA V2 test split. The test accuracy of their best performing model (T5(known in art)), which was been trained in an end-to-end fashion by feeding the sentence "Question: Question tokens Table: Flattened table tokens" to generate the answer directly, is 56.22%. Here they used all types (structural, data retrieval and reasoning) of queries to train (~20.25 M) and test (~4.34 M) the model. On the other hand, for FIBT only representative reasoning type of training queries (69K from ~16.59 M reasoning queries=0.415%) are used in the present disclosure, which were more complex than structural and data retrieval type queries and also had answers belonging to open vocabulary (OV) and test our results on all reasoning queries (~3.56 M). The PlotQA V2 testset results using ChartQA (known in art) are not directly comparable with the proposed approach results. For fair comparison, the present disclosure trains the T5 model, which is the best performing model on the PlotQA V2 test data, following the same setting as one of the existing approaches but with the 69K training samples used in the proposed filtered iterative back-translation (FIBT) based approach and test the model on all reasoning PlotQA test queries (~3.56 M) to get the results depicted in Table 5. The proposed approach yields superior performance in terms of test accuracy, for both FV and OV queries. As expected, the end-to-end T5 model could address the yes/no type of binary queries but not the queries with the numerical answers (FV and OV). This proves the efficacy of the proposed approach to better handle complex OV type of reasoning queries.

To understand the effect of error propagation due to the computer vision pipeline on the downstream reasoning task, the test accuracy of the reasoning task was calculated with the Oracle® schemas provided by PlotQA and it was observed that, a 24.05% lower test accuracy with the extracted schema as compared to the Oracle® schema, which was the drop due to noisy or less precise visual extractions. Further the results were analyzed based on operators involved in the query and it was observed that proposed approach worked well (yielding good test accuracy) not only for reasoning queries involving one primitive operator, but also for more complex queries involving composition of numerical operators such as 'COUNT VALUES GREATER THAN AVERAGE' (For example, For how many years, is the payments made towards primary income greater than the average payments made towards primary income over all years?) or 'SUM GREATER THAN MAX' (For example, Is the sum of the payments made towards goods and services in 2008 and 2010 greater than the maximum payments made towards primary income across all years?) or DIFFERENCE GREATER THAN DIFFERENCE' (For example, reasoning type of query mentioned in Table 1 for dot charts), etc. Further it was observed that the proposed approach does not yield good results for Natural Language (NL) queries (i) involving nesting in the SQL program or (ii) not having explicit mention of phrases showcasing the composition of primitive operations involved. Examples for the Natural Language (NL) queries requiring nested SQL were queries computing a 'DIFFERENCE' between the 'MAXIMUM' and the 'SECOND MAXIMUM' values of the numerical column (For example, the reasoning type of query mentioned in Table 1 for (b) Horizontal bars). In the corresponding SQL program for such queries, to compute the 'SECOND MAXIMUM' value requires nesting. Additional examples of such nested set-of queries were the queries which try to find if the 'SUM' of two numerical values is 'GREATER THAN' the 'SUM' of other two numerical values, for 'EVERY' value of a non-numerical column. These Natural Language (NL) queries demand nested SQL programs which ensured the 'SUM GREATER THAN SUM' criteria were true for 'ALL DISTINCT' values of the non-numerical column. The defined Probabilistic context-free grammar (PCFG) allows synthesis of nested SQL programs (as explained in one of the above sections (Probabilistic context-free grammar)). It was observed that, as such nested SQL programs were not present in the initial training set, the strategy of inducing inverse probabilities for the Probabilistic context-free grammar (PCFG) facilitates synthesis of nested SQL programs in the later iterations of filtered iterative back-translation (FIBT). However, for most of such nested SQL programs the backward model failed to generate semantically meaningful Natural Language (NL) queries, leading to noisy synthetic Natural Language (NL) queries. Such noisy queries are filtered by the filtration strategy of the method of the present disclosure in the backward pass leading to fewer nested query samples in the training data which in turn cause a drop in the test accuracy for such queries. Moreover, in the PlotQA dataset there are Natural Language (NL) queries which do not have explicit mention of phrases showcasing the composition of primitive operations involved. Instead, more abstract phrases such as 'MONOTONICALLY INCREASING' or 'STRICTLY LESS THAN' or 'MAJORITY OF' are used. An example of such a query is depicted in Table 1 (the reasoning type of query for Line charts). To generate an appropriate SQL program, the neural semantic parser needs understanding of these phrases in terms of their mapping to a composition of primitive operations, which is not fed explicitly to the forward model. In the present disclosure it is assumed that the semantic parser has gained this knowledge implicitly with the pre-training mechanism. Lack of such explicit understanding of such phrases can be the reason behind getting lower performance for such queries.

The present disclosure provides a system and method for program synthesis for weakly-supervised multimodal question answering using filtered iterative back-translation. The present disclosure addresses the complex reasoning-based queries on charts that require a combination of natural language understanding, fine-grained perception, and analytical reasoning. With the help of filtered iterative back-translation (FIBT), the SQL programs for the Natural Language (NL) queries are generated without any program annotations. The Probabilistic context-free grammar (PCFG) based approach implemented in the present disclosure helps the semantic parser model to adapt to the given dataset's query compositions and domains, unseen in the bootstrapping data. The proposed approach achieves State-Of-the-Art results on reasoning-based queries for the PlotQA dataset with 60.44% test accuracy, surpassing the previous baselines by a large margin.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g., any kind of computer like a server or a personal computer, or the like, or any combination thereof. The device may also include means which could be e.g., hardware means like e.g., an application-specific integrated circuit (ASIC), a field-programmable gate array (FPGA), or a combination of hardware and software means, e.g., an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g., using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method, comprising:
receiving, via one or more hardware processors, one or more images specific to one or more charts from a dataset and extracting data from the one or more images specific to the one or more charts by employing a computer vision pipeline, wherein the extracted data is stored in a schema of a database and wherein the one or more charts comprises a plurality of questions and a corresponding plurality of answers;
iteratively performing:
  obtaining, via the one or more hardware processors, a first plurality of SQL programs corresponding to a first plurality of Natural Language (NL) queries using a trained first semantic parser model;
  executing, via the one or more hardware processors, the first plurality of SQL programs on the corresponding extracted data of the database to obtain a plurality of answers;
  comparing, via the one or more hardware processors, the plurality of answers for the first plurality of Natural Language (NL) queries corresponding to the obtained first plurality of SQL programs with a corresponding plurality of answers for the first plurality of Natural Language (NL) queries comprised in the dataset;
  filtering, via the one or more hardware processors, the first plurality of SQL programs corresponding to the first plurality of Natural Language (NL) queries based on the comparison, wherein the plurality of answers for the first plurality of Natural Language (NL) queries corresponding to the first plurality of SQL programs are matching with the corresponding plurality of answers for the first plurality of Natural Language (NL) queries comprised in the dataset;
  training, via the one or more hardware processors, a second semantic parser model using the filtered first plurality of SQL programs and a filtered second plurality of SQL programs;
  testing, via the one or more hardware processors, the second semantic parser model on a PlotQA test data, wherein, the PlotQA test data further comprising a plurality of Natural Language (NL) queries is provided as an input to obtain a corresponding plurality of SQL programs as an output;
  executing, via the one or more hardware processors, the obtained plurality of SQL programs to obtain a plurality of answers and comparing the obtained plurality of answers with a reference set of answers of the corresponding Natural Language (NL) queries to obtain a test data accuracy, until a difference of an output between a current iteration and a previous iteration reaches a predefined threshold;
updating, via the one or more hardware processors, a second plurality of probabilities of a Probabilistic Context Free Grammar (PCFG) in the current iteration, if the test data accuracy in the current iteration is greater than a predefined threshold, from a first plurality of probabilities which are inversely proportional to the weights of one or more rules induced by the second plurality of SQL programs synthesized in the previous iteration and a subset of the first plurality of SQL programs comprised in the dataset;
synthesizing, via the one or more hardware processors, a third plurality of SQL programs based on the updated second plurality of probabilities of the Probabilistic Context Free Grammar (PCFG) by:
  sampling the third plurality of SQL programs using a Probabilistic Context Free Grammar (PCFG) sampling process; and
  substituting the sampled third plurality of SQL programs with the extracted data from the database of the corresponding one or more images specific to the one or more charts;
feeding, via the one or more hardware processors, the synthesized third plurality of SQL programs to a backward model to generate a second plurality of Natural Language (NL) queries;
filtering, via the one or more hardware processors, the generated second plurality of Natural Language (NL) queries to obtain a subset of the second plurality of Natural Language (NL) queries and a corresponding subset of the third plurality of SQL programs;
filtering, via the one or more hardware processors, the obtained subset of the second plurality of Natural Language (NL) queries using a semantic based filtering technique to obtain one or more pairs of a third plurality of Natural Language (NL) queries and a corresponding fourth plurality of SQL programs by:
  localizing a plurality of operators comprised in the subset of the second plurality of Natural Language (NL) queries and localizing a plurality of operators comprised in the corresponding subset of the third plurality of SQL programs; and
  comparing the localized plurality of operators comprised in the subset of the second plurality of Natural Language (NL) queries with the corresponding localized operator in the corresponding subset of the third plurality of SQL programs; and
fine-tuning, via the one or more hardware processors, the first semantic parser model using the obtained one or more pairs of the third plurality of Natural Language (NL) queries and the corresponding fourth plurality of SQL programs and one or more pairs of the subset of the first plurality of Natural Language (NL) queries and the corresponding subset of the first plurality of SQL programs obtained from the filtered first plurality of SQL programs comprised in the dataset.

2. The processor implemented method of claim 1, wherein the plurality of answers comprises numerical values and Boolean values.

3. The processor implemented method of claim 1, wherein the step of filtering the generated second plurality of Natural Language (NL) queries to obtain the subset of the second plurality of Natural Language (NL) queries and the corresponding subset of the third plurality of SQL programs comprises:
   extracting a representation for the generated second plurality of Natural Language (NL) queries using a sentence BERT (Bidirectional Encoder Representations from Transformers) technique; and
   comparing the extracted representation for the generated second plurality of Natural Language (NL) queries with a representation for the first plurality of Natural Language (NL) queries comprised in the dataset using a cosine similarity.

4. A system, comprising:
   a memory storing instructions;
   one or more communication interfaces; and
   one or more hardware processors coupled to the memory via the one or more communication interfaces, wherein the one or more hardware processors are configured by the instructions to:
      receive one or more images specific to one or more charts from a dataset and extracting data from the one or more images specific to the one or more charts by employing a computer vision pipeline, wherein the extracted data is stored in a schema of a database and wherein the one or more charts comprises a plurality of questions and a corresponding plurality of answers;
      iteratively perform:
         obtain a first plurality of SQL programs corresponding to a first plurality of Natural Language (NL) queries using a trained first semantic parser model;
         execute the first plurality of SQL programs on the corresponding extracted data of the database to obtain a plurality of answers;
         compare the plurality of answers for the first plurality of Natural Language (NL) queries corresponding to the obtained first plurality of SQL programs with a corresponding plurality of answers for the first plurality of Natural Language (NL) queries comprised in the dataset;
         filter the first plurality of SQL programs corresponding to the first plurality of Natural Language (NL) queries based on the comparison, wherein the plurality of answers for the first plurality of Natural Language (NL) queries corresponding to the first plurality of SQL programs are matching with the corresponding plurality of answers for the first plurality of Natural Language (NL) queries comprised in the dataset;
         train a second semantic parser model using the filtered first plurality of SQL programs and a filtered second plurality of SQL programs;
         test the second semantic parser model on a PlotQA test data, wherein, the PlotQA test data further comprising a plurality of Natural Language (NL) queries is provided as an input to obtain a corresponding plurality of SQL programs as an output;
         execute the obtained plurality of SQL programs to obtain a plurality of answers and comparing the obtained plurality of answers with a reference set of answers of the corresponding Natural Language (NL) queries to obtain a test data accuracy, until a difference of an output between a current iteration and a previous iteration reaches a predefined threshold;
         update a second plurality of probabilities of a Probabilistic Context Free Grammar (PCFG) in the current iteration, if the test data accuracy in the current iteration is greater than a predefined threshold, from a first plurality of probabilities which are inversely proportional to the weights of one or more rules induced by the second plurality of SQL programs synthesized in the previous iteration and a subset of the first plurality of SQL programs comprised in the dataset;
         synthesize a third plurality of SQL programs based on the updated second plurality of probabilities of the Probabilistic Context Free Grammar (PCFG) by:
            sampling the third plurality of SQL programs using a Probabilistic Context Free Grammar (PCFG) sampling process; and
            substituting the sampled third plurality of SQL programs with the extracted data from the database of the corresponding one or more images specific to the one or more charts;
         feed the synthesized third plurality of SQL programs to a backward model to generate a second plurality of Natural Language (NL) queries;
         filter the generated second plurality of Natural Language (NL) queries to obtain a subset of the second plurality of Natural Language (NL) queries and a corresponding subset of the third plurality of SQL programs;
         filter the obtained subset of the second plurality of Natural Language (NL) queries using a semantic based filtering technique to obtain one or more pairs of a third plurality of Natural Language (NL) queries and a corresponding fourth plurality of SQL programs by:
            localizing a plurality of operators comprised in the subset of the second plurality of Natural Language (NL) queries and localizing a plurality of operators comprised in the corresponding subset of the third plurality of SQL programs; and
            comparing the localized plurality of operators comprised in the subset of the second plurality of Natural Language (NL) queries with the corresponding localized operator in the corresponding subset of the third plurality of SQL programs; and
         fine-tune the first semantic parser model using the obtained one or more pairs of the third plurality of Natural Language (NL) queries and the corresponding fourth plurality of SQL programs and one or more pairs of the subset of the first plurality of Natural Language (NL) queries and the corresponding subset of the first plurality of SQL programs obtained from the filtered first plurality of SQL programs comprised in the dataset.

5. The system of claim 4, wherein the plurality of answers comprises numerical values and Boolean values.

6. The system of claim 4, wherein the step of filtering the generated second plurality of Natural Language (NL) queries to obtain the subset of the second plurality of Natural Language (NL) queries and the corresponding subset of the third plurality of SQL programs comprises:
   extracting a representation for the generated second plurality of Natural Language (NL) queries using a sentence BERT (Bidirectional Encoder Representations from Transformers) technique; and comparing the extracted representation for the generated second plurality of Natural Language (NL) queries with a representation for the first plurality of Natural Language (NL) queries comprised in the dataset using a cosine similarity.

7. One or more non-transitory machine-readable information storage mediums comprising one or more instructions which when executed by one or more hardware processors cause:

receiving, or more images specific to one or more charts from a dataset and extracting data from the one or more images specific to the one or more charts by employing a computer vision pipeline, wherein the extracted data is stored in a schema of a database and wherein the one or more charts comprises a plurality of questions and a corresponding plurality of answers;

iteratively performing:

obtaining a first plurality of SQL programs corresponding to a first plurality of Natural Language (NL) queries using a trained first semantic parser model;

executing the first plurality of SQL programs on the corresponding extracted data of the database to obtain a plurality of answers;

comparing the plurality of answers for the first plurality of Natural Language (NL) queries corresponding to the obtained first plurality of SQL programs with a corresponding plurality of answers for the first plurality of Natural Language (NL) queries comprised in the dataset;

filtering the first plurality of SQL programs corresponding to the first plurality of Natural Language (NL) queries based on the comparison, wherein the plurality of answers for the first plurality of Natural Language (NL) queries corresponding to the first plurality of SQL programs are matching with the corresponding plurality of answers for the first plurality of Natural Language (NL) queries comprised in the dataset;

training a second semantic parser model using the filtered first plurality of SQL programs and a filtered second plurality of SQL programs;

testing the second semantic parser model on a PlotQA test data, wherein, the PlotQA test data further comprising a plurality of Natural Language (NL) queries is provided as an input to obtain a corresponding plurality of SQL programs as an output;

executing the obtained plurality of SQL programs to obtain a plurality of answers and comparing the obtained plurality of answers with a reference set of answers of the corresponding Natural Language (NL) queries to obtain a test data accuracy, until a difference of an output between a current iteration and a previous iteration reaches a predefined threshold;

updating a second plurality of probabilities of a Probabilistic Context Free Grammar (PCFG) in the current iteration, if the test data accuracy in the current iteration is greater than a predefined threshold, from a first plurality of probabilities which are inversely proportional to the weights of one or more rules induced by the second plurality of SQL programs synthesized in the previous iteration and a subset of the first plurality of SQL programs comprised in the dataset;

synthesizing a third plurality of SQL programs based on the updated second plurality of probabilities of the Probabilistic Context Free Grammar (PCFG) by:

sampling the third plurality of SQL programs using a Probabilistic Context Free Grammar (PCFG) sampling process; and substituting the sampled third plurality of SQL programs with the extracted data from the database of the corresponding one or more images specific to the one or more charts;

feeding the synthesized third plurality of SQL programs to a backward model to generate a second plurality of Natural Language (NL) queries;

filtering the generated second plurality of Natural Language (NL) queries to obtain a subset of the second plurality of Natural Language (NL) queries and a corresponding subset of the third plurality of SQL programs;

filtering the obtained subset of the second plurality of Natural Language (NL) queries using a semantic based filtering technique to obtain one or more pairs of a third plurality of Natural Language (NL) queries and a corresponding fourth plurality of SQL programs by:

localizing a plurality of operators comprised in the subset of the second plurality of Natural Language (NL) queries and localizing a plurality of operators comprised in the corresponding subset of the third plurality of SQL programs; and comparing the localized plurality of operators comprised in the subset of the second plurality of Natural Language (NL) queries with the corresponding localized operator in the corresponding subset of the third plurality of SQL programs; and fine-tuning the first semantic parser model using the obtained one or more pairs of the third plurality of Natural Language (NL) queries and the corresponding fourth plurality of SQL programs and one or more pairs of the subset of the first plurality of Natural Language (NL) queries and the corresponding subset of the first plurality of SQL programs obtained from the filtered first plurality of SQL programs comprised in the dataset.

8. The one or more non-transitory machine-readable information storage mediums of claim 7, wherein the plurality of answers comprises numerical values and Boolean values.

9. The one or more non-transitory machine-readable information storage mediums of claim 7, wherein the step of filtering the generated second plurality of Natural Language (NL) queries to obtain the subset of the second plurality of Natural Language (NL) queries and the corresponding subset of the third plurality of SQL programs comprises:

extracting a representation for the generated second plurality of Natural Language (NL) queries using a sentence BERT (Bidirectional Encoder Representations from Transformers) technique; and comparing the extracted representation for the generated second plurality of Natural Language (NL) queries with a representation for the first plurality of Natural Language (NL) queries comprised in the dataset using a cosine similarity, The method of claim 1, wherein each of the plurality of models is either the physics-based model or the data-driven model or a hybrid physics plus data-driven model.

* * * * *